United States Patent
Ramanand et al.

(10) Patent No.: US 12,417,421 B2
(45) Date of Patent: *Sep. 16, 2025

(54) REMOTE CLEANING QUALITY MANAGEMENT SYSTEMS AND RELATED METHODS OF USE

(71) Applicant: Anram Holdings, Mississauga (CA)

(72) Inventors: Prakash Valentino Ramanand, Burlington (CA); Manjinder Singh Dhillon, Milton (CA); Pratik Jitendrakumar Shah, Guelph (CA); Christopher William Ramanand, Winnipeg (CA)

(73) Assignee: Anram Holdings, Oakville (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/534,193

(22) Filed: Dec. 8, 2023

(65) Prior Publication Data

US 2024/0135298 A1    Apr. 25, 2024

Related U.S. Application Data

(63) Continuation of application No. 17/713,530, filed on Apr. 5, 2022, now Pat. No. 11,880,799, which is a
(Continued)

(51) Int. Cl.
*G06Q 10/00* (2023.01)
*G01S 7/41* (2006.01)
(Continued)

(52) U.S. Cl.
CPC ........ *G06Q 10/06395* (2013.01); *G01S 7/415* (2013.01); *G01S 13/42* (2013.01);
(Continued)

(58) Field of Classification Search
USPC .............................. 455/456.1, 457; 701/300
See application file for complete search history.

(56) References Cited

U.S. PATENT DOCUMENTS 7,298,327 B2 * 11/2007 Dupray ................. G01S 5/0278
342/451
7,945,470 B1    5/2011 Cohen
(Continued)

FOREIGN PATENT DOCUMENTS

JP    2013134566    7/2013

OTHER PUBLICATIONS

Cheng, Tao, and Jochen Teizer. "Real-time resource location data collection and visualization technology for construction safety and activity monitoring applications." Automation in construction 34 (2013): 3-15. (Year: 2013).*
(Continued)

*Primary Examiner* — Gurkanwaljit Singh
(74) *Attorney, Agent, or Firm* — Rowand LLP

(57) ABSTRACT

Embodiments of the present disclosure disclose a method for remotely managing a cleaning quality for an indoor location being cleaned. The method includes accessing a training dataset including a plurality of plot points and associated signal strengths of a predefined signal received from a fixed network device, where at least one plot point is preselected based on a predefined cleaning attribute associated with a physical spot corresponding to the at least one plot point; receiving the predefined signal at a position in the indoor location from the fixed network device, where the received signal has a second signal strength and the position is determined proximate to the plot point based on the second signal strength and each of the signal strengths; and calculating a cumulative duration spent at the determined position
(Continued)

based on a predefined cleaning schedule to assess the cleaning quality for the physical spot.

20 Claims, 11 Drawing Sheets

Related U.S. Application Data continuation of application No. 16/532,907, filed on Aug. 6, 2019, now Pat. No. 11,321,657.

(60) Provisional application No. 62/715,524, filed on Aug. 7, 2018.

(51) Int. Cl.
| | | |
|---|---|---|
| *G01S 13/42* | (2006.01) | |
| *G01S 17/89* | (2020.01) | |
| *G06F 16/29* | (2019.01) | |
| *G06Q 10/0639* | (2023.01) | |
| *G06Q 10/1093* | (2023.01) | |
| *H04W 4/029* | (2018.01) | |
| *G06N 5/02* | (2023.01) | |
| *H04W 16/20* | (2009.01) | |
| *H04W 84/18* | (2009.01) | |

(52) U.S. Cl.
CPC .............. *G01S 17/89* (2013.01); *G06F 16/29* (2019.01); *G06Q 10/1097* (2013.01); *H04W 4/029* (2018.02); *G06F 2221/2111* (2013.01); *G06N 5/02* (2013.01); *H04W 16/20* (2013.01); *H04W 84/18* (2013.01)

(56) References Cited

U.S. PATENT DOCUMENTS

| | | | |
|---|---|---|---|
| 8,217,759 B2* | 7/2012 | Tessier | G06Q 10/06 340/572.1 |
| 8,378,826 B2 | 2/2013 | Mercier | |
| 9,134,398 B2* | 9/2015 | Dupray | G01S 5/0009 |
| 9,456,311 B2* | 9/2016 | Ozkan | H04W 4/04 |
| 10,697,778 B2* | 6/2020 | Shu | G01C 21/206 |
| 10,872,160 B2 | 12/2020 | AthuluruTIrumala | |
| 2006/0102532 A1 | 5/2006 | Cadotte, Jr. | |
| 2009/0327102 A1* | 12/2009 | Maniar | G06Q 10/08 705/28 |
| 2011/0084840 A1 | 4/2011 | Mercier | |
| 2011/0289010 A1 | 11/2011 | Rankin, Jr. | |
| 2013/0095459 A1* | 4/2013 | Tran | G09B 19/00 434/247 |
| 2014/0274031 A1* | 9/2014 | Menendez | H04W 4/029 455/552.1 |
| 2015/0168159 A1* | 6/2015 | Chao | G01C 21/1654 701/428 |
| 2015/0205985 A1 | 7/2015 | Jinadatha | |
| 2015/0228181 A1 | 8/2015 | Himmelmann | |
| 2015/0289111 A1* | 10/2015 | Ozkan | H04W 4/029 455/456.1 |
| 2015/0358790 A1* | 12/2015 | Nasserbakht | G06F 21/32 726/19 |
| 2015/0371176 A1* | 12/2015 | Barrett | G06Q 10/0631 705/2 |
| 2016/0125348 A1* | 5/2016 | Dyer | G06Q 10/08 705/7.42 |
| 2017/0023947 A1* | 1/2017 | McMillion | B64U 80/25 |
| 2017/0024531 A1* | 1/2017 | Malaviya | G16H 50/30 |
| 2017/0301039 A1* | 10/2017 | Dyer | G06Q 10/063114 |
| 2018/0066944 A1* | 3/2018 | Shu | G01C 22/006 |
| 2018/0317725 A1* | 11/2018 | Lee | B25J 15/0491 |
| 2019/0156443 A1 | 5/2019 | Hall | |
| 2019/0212752 A1* | 7/2019 | Fong | G06V 10/82 |
| 2019/0332785 A1* | 10/2019 | AthuluruTIrumala | H04W 8/005 |
| 2019/0381443 A1 | 12/2019 | Kim | |
| 2020/0097874 A1* | 3/2020 | Wannenmacher | G06Q 10/0633 |
| 2020/0250774 A1 | 8/2020 | Agarwal | |

OTHER PUBLICATIONS

Li, Heng, et al. "Real-time locating systems applications in construction." Automation in Construction 63 (2016): 37-47. (Year: 2016).*

Puko, Zoran, Nataša Šuman, and Danijel Rebolj. "Automated continuous construction progress monitoring using multiple workplace real time 3D scans." Advanced Engineering Informatics 38 (2018): 27-40. (Year: 2018).*

Hwang, Sungjoo, and SangHyun Lee. "Wristband-type wearable health devices to measure construction workers' physical demands." Automation in Construction 83 (2017): 330-340. (Year: 2017).*

Dong, Shuang, Heng Li, and Qin Yin. "Building information modeling in combination with real time location systems and sensors for safety performance enhancement." Safety science 102 (Feb. 2018): 226-237. (Year: 2018).*

Vera, Rodrigo, Sergio F. Ochoa, and Roberto G. Aldunate. "EDIPS: an Easy to Deploy Indoor Positioning System to support loosely coupled mobile work." Personal and Ubiquitous Computing 15 (2011): 365-376. (Year: 2011).*

International Search Report & Written Opinion dated Oct. 4, 2019, WIPO: Application No. PCT/CA2019/051077.

USPTO, Office Action relating to U.S. Appl. No. 16/532,907 dated Sep. 13, 2021.

Pucko, Zoran, Natasa Suman, and Danijel Rebolj, "Automated continuous construction progress monitoring using multiple workplace real time 3D scans." Advanced Engineering Informatics 38 (2018): 27-40, (Year: 2018).

Dong, Shuan, Heng Li, and Qin Yin, "Building Information modeling in combination with real time location systems and sensors for safety performance enhancement." Safety science 102 (Feb. 2018): 226-237. (Year: 2018).

* cited by examiner

REMOTE CLEANING QUALITY MANAGEMENT SYSTEMS AND RELATED METHODS OF USE

TECHNICAL FIELD

The subject matter described herein generally relates to cleaning management systems and particularly relates to remote cleaning quality management systems.

BACKGROUND

Everyone can appreciate a well-cleaned and well-organized facility or dwelling. In a commercial set-up, a clean and organized workspace promotes health, morale, and productivity of its occupants. Such workspace also makes a great first impression on potential customers and visitors, thereby boosting sales as well as brand image of an occupying business. Often a cleaning or janitorial staff is deployed to perform various cleaning tasks such as garbage disposal, vacuum cleaning, wiping dust and stains from surfaces, replenishing consumables and utility items (e.g., pens, notepads, water bottles, coffee pods, etc.), and organizing spatial items (e.g., furniture, communication equipment, etc.). The cleaning or janitorial staff is typically unskilled or untrained and therefore, often require training through videos, site-specific cleaning demonstrations, on-the-job feedback, etc. to improve their cleaning performance. Despite such trainings, the cleaning quality delivered by the staff invariably falls short of the expected cleaning standard.

SUMMARY

One common approach to address the issue of substandard cleaning quality includes tracking a location of a cleaning staff using the global positioning system (GPS) or that inputted by the cleaning staff upon arrival at a geographical location such as an airport for an assigned work shift. Additionally, the total time spent by the cleaning staff at the geographical location is determined based on the clock times at which the staff arrives and leaves that location. Both the total time and the geographical location (indicated by GPS coordinates) of the cleaning staff are typically used as a measure of cleaning quality, despite those defining mere availability of the cleaning staff at the geographical location for the corresponding work shift. The cleaning quality measured by this approach often fails to indicate whether various indoor areas at the geographical location are attended for being cleaned by the cleaning staff and is therefore inaccurate and unreliable. Moreover, GPS signals weaken through building structures and are unsuitable for indoor determination of the cleaning quality.

Another typical approach includes a checklist of cleaning tasks being filled-out by the cleaning staff or an inspection staff after the indoor areas are cleaned. The filled-out checklist is evaluated independently or in combination with various inputs (e.g., comments from the staff or the customer, site photographs, etc.) based on physical inspections of the cleaned indoor areas to assess the cleaning quality. The filled-out checklist is subject to inaccuracies due to the incorrect or variable understanding of the expected cleaning quality by the cleaning staff, or the inspection staff, and is therefore unreliable. Additionally, the physical inspections are time-consuming, cost-intensive, and unreliable due to a difference in the level of experience and skill as well as susceptibility to bias of the inspection staff.

Yet another traditional approach includes indoor solutions for monitoring the cleaning or inspection staff through the indoor areas to be cleaned. These indoor solutions typically require additional hardware such as cameras and/or active radiofrequency beacons to be physically installed at various indoor areas, thereby magnifying the system and operational costs. Moreover, similar to the GPS-based approach, these solutions determine the presence and therefore, mere availability, of the cleaning or inspection staff at those indoor areas. These hardware-intensive solutions fail to determine the quality of cleaning performed at various points in those indoor areas or whether such cleaning quality meets the expected cleaning standard without the physical inspections. Therefore, there exists a need for a simpler, robust, reliable, and economical solution for remote cleaning quality management.

One embodiment of the present disclosure includes a computer-implemented method for remotely managing a cleaning quality for an indoor location being cleaned. The method may include accessing, using a remote cleaning quality management (RCQM) module on a computer with a processor and a memory, a training dataset including a plurality of plot points and one or more signal strengths associated therewith of a predefined signal received from at least one spatially fixed network device. The plurality of plot points may correspond to physical spots at the indoor location, where at least one plot point may be preselected from the plurality of plot points based on a predefined cleaning attribute associated with a physical spot corresponding to the at least one plot point. The method also includes receiving, using the RCQM module, the predefined signal at a position in the indoor location from the at least one spatially fixed network device. The received signal may have a second signal strength greater than a predefined signal threshold value, where the position may be determined proximate to the at least one plot point based on the second signal strength in combination with each of the one or more signal strengths. The method may further include calculating, using the RCQM module, a cumulative duration spent at the determined position based on a predefined cleaning schedule to assess a cleaning quality for the physical spot. The cleaning quality may be assessed based on the calculated cumulative duration being compared with a set of one or more predefined time threshold values.

One aspect of the present disclosure includes providing, using an output module on the computer in communication with the RCQM module, an indication based on the calculated cumulative duration exceeding a predefined time threshold value in the set of one or more predefined time threshold values.

Another aspect of the present disclosure includes the set of one or more predefined time threshold values being relative to a total time spent proximate to at least one of (i) the physical spot, (ii) the indoor location, (iii) a geographical location indicating the indoor location, and any combinations thereof.

Yet another aspect of the present disclosure includes each of the plurality of plot points is a virtual reference point associated with a floor plan of the indoor location, where at least one of the plurality of plot points is mapped on the floor plan relative to one or more preliminary plot points, which are preassigned to the floor plan based on physical characteristics of the indoor location, where the one or more preliminary plot points assist in defining a virtual fence proximate to the physical spot at the indoor location.

Still another aspect of the present disclosure includes the cleaning schedule having a predefined maximum duration for completing a cleaning task within a preset period, where the predefined maximum duration may be less than the preset period.

A further aspect of the present disclosure includes the cleaning attribute having at least one of (i) the cleaning schedule, (ii) a cleaning task or a type thereof, (iii) a cleaning product, (iv) a cleaning equipment, (v) a proximity of the physical spot from a user or a predefined area proximate to the indoor location, (vi) a clock time, and any combinations thereof.

Another aspect of the present disclosure includes the predefined signal threshold value ranging from approximately −70 dBm to approximately −10 dBm.

Yet another aspect of the present disclosure includes the predefined signal corresponding to at least one of a radiofrequency signal, a light signal, a sound signal, and any combinations thereof.

Still another aspect of the present disclosure includes the predefined signal being a Wi-Fi signal.

A further aspect of the present disclosure includes the cumulative duration having a single duration or a sum of at least two temporally separate durations.

Another embodiment of the present disclosure may include a system for remotely managing a cleaning quality for an indoor location being cleaned. The system may include a portable device capable of being navigated across one or more surfaces in the indoor location. The portable device may be configured to: (1) access a training dataset including a plurality of plot points and one or more signal strengths associated therewith of a predefined signal received from at least one spatially fixed network device, where the plurality of plot points corresponds to physical spots at the indoor location; (2) receive the predefined signal at a position in the indoor location from the at least one spatially fixed network device, where the received signal has a second signal strength greater than a predefined signal threshold value; and (3) calculate a cumulative duration at the position based on a predefined cleaning schedule. The system may also include a server in communication with the portable device. The server may be configured to: (1) select at least one plot point from the plurality of plot points based on a predefined cleaning attribute associated with a physical spot corresponding to the at least one plot point; (2) determine the position being proximate to the selected at least one plot point based on the second signal strength in combination with each of the one or more signal strengths; and (3) assess a cleaning quality for the physical spot based on the calculated cumulative duration at the determined position being compared with a set of one or more predefined time threshold values, where a portion of the calculated cumulative duration exceeding a maximum time threshold value in the set is unaccounted towards assessing the cleaning quality.

Another aspect of the present disclosure includes the server being further configured to provide an indication based on the calculated cumulative duration exceeding the maximum time threshold value.

The above summary of exemplary embodiments is not intended to describe each disclosed embodiment or every implementation of the present disclosure. Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to drawings, wherein like parts are designated by like numerals throughout. The following description is intended only by way of example, and simply illustrates certain selected embodiments of systems and methods that are consistent with the subject matter as claimed herein.

DETAILED DESCRIPTION

Figure 1:
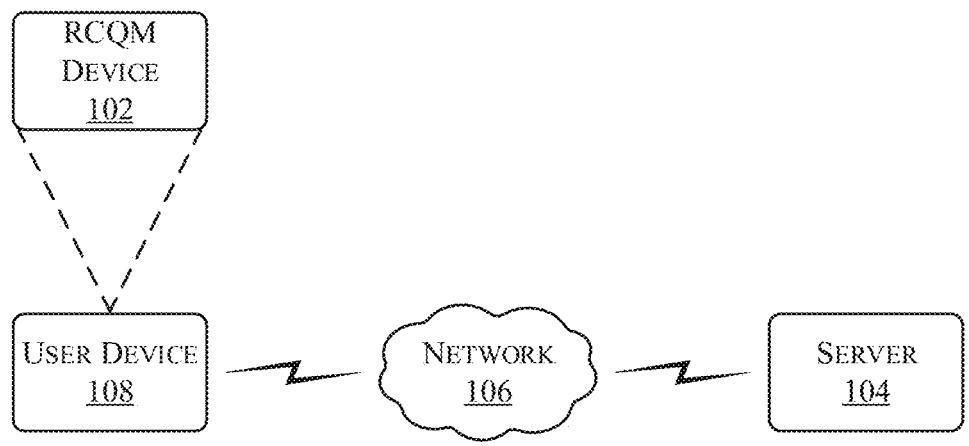
FIGS. 1-4 are schematics of network environments including an exemplary remote cleaning quality management (RCQM) device, according to embodiments of the present disclosure.

The following detailed description is provided with reference to the figures. Exemplary embodiments are described to illustrate the disclosure, not to limit its scope, which is defined by the claims. Those of ordinary skill in the art will recognize a number of equivalent variations in the description that follows without departing from the scope and spirit of the disclosure.

Non-Limiting Definitions

Definitions of one or more terms that will be used in this disclosure are described below without limitations. For a person skilled in the art, it is understood that the definitions are provided just for the sake of clarity and are intended to include more examples than just provided in the detailed description.

A "user" is used in the present disclosure within the context of its broadest definition. The user may refer to a person, a machine, an artificial intelligence unit, or any other entity, which may communicate with one or more modules loaded or integrated with an electronic device capable of or configured to perform a specific function. The entity may include a group of persons or organizations such as professional services organizations, product manufacturing organizations, finance management organizations, real estate organizations, marketing firms, marketplaces, and so on that can operate online over a network.

A "cleaning task" or "cleaning," including all its variations, are used interchangeably in the present disclosure within the context of its broadest definition. The cleaning may refer to an act, task, or state directed towards (1) the prevention of spread of infections or diseases, (2) dust control, (3) preservation of fabrics, fixtures, fittings, furnishings, or similar, (4) a provision of an environment acceptable for intended use in various settings such as social or business settings, and/or (5) safety.

A "designated physical location" is used in the present disclosure within the context of its broadest definition. The designated physical location may refer to an indoor location or a section proximate thereto within a physical space represented by or indicative of a geographical location. In some cases, the designated physical location may represent a sub-location within a predefined proximity of the geographical location.

A "designated cleaning location" is used in the present disclosure within the context of its broadest definition. The designated cleaning location may refer to a surface or a region of the designated physical location, or a portion proximate thereto, where the cleaning task is intended to be performed.

A "cleaning frequency" is used in the present disclosure within the context of its broadest definition. The cleaning frequency may refer to the number of times the designated cleaning location is cleaned within a predefined period.

A "cleaning task repetition" is used in the present disclosure within the context of its broadest definition. The cleaning task repetition may refer to the number of times a specific cleaning task is performed independently or in association with (1) another cleaning task, (2) a cleaning entity (e.g., the user, a cleaning equipment, etc.), or (3) the cleaning frequency.

A "cleaning schedule" is used in the present disclosure within the context of its broadest definition. The cleaning schedule may refer to a set of at least one cleaning task and a maximum duration associated therewith for completing that cleaning task within a preset period. In some cases, the cleaning schedule may include only a maximum duration available for cleaning the designated physical location, or a portion thereof, within the preset period. In some other cases, the preset period may be defined by set clock times.

A "cleaning quality" is used in the present disclosure within the context of its broadest definition. The cleaning quality may refer to a degree of cleanliness including spatial organization achieved upon completion of a single cleaning task or a set of cleaning tasks. The degree of cleanliness may be related to, without limitation, (1) the cleaning frequency; (2) the cleaning task repetition; (3) a skill, experience, or performance of the cleaning entity, (4) the cleaning task, (5) an inspection of (a) the cleaning task, or an outcome thereof, and/or (b) the designated cleaning location; (6) a type of the cleaning entity, or technologies involved therewith; (7) an intended use of the designated cleaning location or any locations proximate thereto; (8) the cleaning schedule; (9) time-bound cleaning obligations or expectations; (9) socio-economic factors related to the designated physical location or a location proximate thereto (e.g., type and frequency of use, brand value, a number of simultaneous users, etc.).

A "plot point" is used in the present disclosure within the context of its broadest definition. The plot point may refer to a virtual reference point indicative of a physical spot at the designated physical location or a portion thereof.

A "floor plan" is used in the present disclosure within the context of its broadest definition. The floor plan may refer to a scale diagram, digital imagery, virtual model, mathematical representation, or any combinations thereof, indicating a designated physical location or a portion thereof, and/or its relationship with other designated physical locations or portions thereof.

A "signal plot plan" is used in the present disclosure within the context of its broadest definition. The signal plot plan may refer to the floor plan including at least one plot point indicative of a physical location of an entity receiving or providing signal attributes (e.g., signal strength; signal proximity from a signal provider such as an access point; regions of signal construction, attenuation, or interference; time of flight; angle of arrival; etc.).

A "training dataset" is used in the present disclosure within the context of its broadest definition. The training dataset may refer to a set of one or more signal plot points and associated strength of signals received at physical spots indicated by those signal plot points. In some embodiments, the training dataset may also include additional parameters (e.g., (i) relative proximity from predetermined network devices; (ii) media access control (MAC) address of the signal provider; (iii) associated geographical location coordinates, etc.) and values thereof.

A "stable signal" is used in the present disclosure within the context of its broadest definition. The stable signal may refer to two or more samples of a predefined signal (e.g., a radiofrequency signal, a light signal, a sound signal, etc.) having at least one aspect (e.g., frequency, wavelength, signal strength or power, angle of arrival, time of flight, etc.) at an acceptable value relative to a predetermined signal threshold value for a predefined amount of time when the predefined signal is received by a predefined or dynamically defined destination or entity. In some cases, the acceptable value of the at least one aspect may allow the predefined signal to become detectable. In some other cases, the acceptable value may be equal to or greater than the predetermined signal threshold value.

A "scanning proximity" is used in the present disclosure within the context of its broadest definition. The scanning proximity may refer to a predetermined region proximate to an entity or a location where the stable signal is receivable.

Exemplary Embodiments

FIGS. 1-4 are schematics of network environments including an exemplary remote cleaning quality management (RCQM) device, according to embodiments of the present disclosure. Embodiments are disclosed in the context of remotely managing the cleaning quality upon a cleaning task being performed at a designated physical location such as an indoor location. However, some embodiments may be applied for (i) remote management of a localized activity, (ii) time or priority management, or (iii) efficiency management at indoor and/or alfresco areas within a physical space indicative of or represented by a geographical location (e.g., an airport) in the context of various business, social, and personal scenarios. Examples of such scenarios may include, but are not limited to, item tracking through multiple checkpoints in factories, warehouses, garages, etc.; serving food at different tables in a restaurant; interactions of attendees with people, items, or events in conference halls, amusement parks, etc.; people meeting each other during speed dating or matchmaking events; shopping in malls; indoor marketing; staff or visitor management in fenced premises such as hotels and airports; managing activities of drones, robots, or autonomous vehicles for intended use; neighborhood watch; observing behaviors of animals within designated spaces such as homes and animal shelters; determining seating preferences of different types of diners at cafés and patios associated therewith; and so on.

The illustrated embodiments (FIGS. 1-4) include an RCQM device 102 in communication with one or more network devices such as a server 104 over a network 106. The network 106 may include any software, hardware, or computer applications capable of providing a medium to exchange signals or data in any format known in the art, related art, or developed later. The network 106 may include, but is not limited to, social media platforms implemented as a website, a unified communication application, or a standalone application. Examples of the social media platforms may include, but are not limited to, Twitter™, Facebook™, Skype™, Microsoft Lync™, Cisco Webex™, and Google Hangouts™. Further, the network 106 may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL), Wi-Fi, radio, television, cable, satellite, and/or any other delivery or tunneling mechanism for carrying data. The network 106 may include multiple networks or sub-networks, each of which may include, e.g., a wired or wireless data pathway. The network 106 may include a circuit-switched voice network, a packet-switched data network, or any other network configurable to carry electronic communications. For example, the network 106 may include networks based on the Internet protocol (IP) or asynchronous transfer mode (ATM), and may support voice using, for example, VoIP, Voice-over-ATM, or other comparable protocols used for voice, video, and data communications.

In a first exemplary embodiment (FIG. 1), the RCQM device 102 may be installed, integrated, or operatively associated with a user device 108, which may include any computing device known in the art, related art, or developed later capable of being implemented, wholly or in-part, as a movable or portable device. Examples of the user device 108 may include, but are not limited to, a mobile computing device (e.g., a mobile phone, a tablet, a laptop, a smartwatch, etc.), a portable internet appliance, and powered or unpowered devices capable of being spatially navigated (e.g., a Segway, a wheelchair, a vacuum cleaner, a curing machine, a disinfection device, a standalone radiofrequency transceiver sticker, etc.). The RCQM device 102 may be preconfigured or dynamically configured to, at least one of, (1) communicate synchronously or asynchronously with one or more software applications, databases, storage devices, or appliances operating via same or different communication protocols, formats, database schemas, platforms or any combination thereof, to send and receive a variety of data; (2) collect, define, store, and analyze the data; (3) formulate one or more tasks for being performed on or trained from the data; (4) provide, execute, communicate, and/or assist in formulating one or more mathematical models for tasks related to collection, identification, manipulation, and/or presentation of the data; (5) display, print, or communicate the identified, manipulated, and/or presentable data; and (6) transfer or map the models, tasks, parameters, attributes, and associated values of the data to one or more networked computing devices and/or data repositories.

The RCQM device 102 may represent any of a wide variety of devices capable of providing remote cleaning quality management services to the network devices. Alternatively, the RCQM device 102 may be implemented as a software application or a device driver. The RCQM device 102 may enhance or increase the functionality and/or capacity of the network, such as the network 106, to which it may be connected. In some embodiments, the RCQM device 102 may be also configured, for example, to perform notification tasks, security tasks, network management tasks including Internet protocol (IP) address management, and other tasks. In some other embodiments, the RCQM device 102 may be further configured to expose its computing environment or operating code to a user, and may include related art input or output (I/O) devices, such as a keyboard, a camera, and a display device. The RCQM device 102 of some embodiments may, however, include software, firmware, or other resources that support the remote administration, operation, power control, and/or maintenance of the RCQM device 102.

In further embodiments, the RCQM device 102 either in communication with any of the network devices such as the user device 108, or dedicatedly, may have video, voice, or data communication capabilities (e.g., unified communication capabilities) by being coupled to or including, various imaging devices (e.g., cameras, printers, scanners, medical imaging systems, etc.), various audio devices (e.g., microphones, music players, recorders, audio input devices, speakers, audio output devices, telephones, speaker telephones, etc.), various video devices (e.g., monitors, projectors, displays or display screens, televisions, video output devices, video input devices, camcorders, etc.), or any other types of hardware, in any combination thereof. In some embodiments, the RCQM device 102 may comprise or implement various real time protocols and non-real-time protocols known in the art, related art, or developed later to facilitate data transfer among the user device 108, the server 104, and the RCQM device 102, or any other network devices. In some embodiments, the RCQM device 102 may be configured to convert communications, which may include instructions, queries, data, files, etc., from the user device 108 into appropriate formats to make such communications compatible with the network devices (e.g., the server 104, another RCQM device, etc.) and vice versa. Consequently, the RCQM device 102 may allow implementation of the network devices using different technologies or by different organizations, such as a third-party vendor, managing the server 104 or associated services based on a proprietary technology.

A second embodiment (FIG. 2) may include an RCQM device 110-1 and an RCQM device 110-2 (collectively, referred to as the RCQM devices 110), each being similar to the RCQM device 102. The RCQM devices 110 may be operatively coupled to each other and preconfigured or dynamically configured to interact with the server 104 over the network 106. For example, the RCQM device 110-1 may be installed on, integrated, or operatively associated with the server 104, which may be implemented as any of a variety of computing devices including, for example, general-purpose computing devices, multiple networked servers (arranged in clusters or as a server farm), a mainframe, or so forth. On the other hand, the RCQM device 110-2 may be implemented as a standalone device in communication with the RCQM device 110-1 via the server 104 on the network 106.

Figure 2:
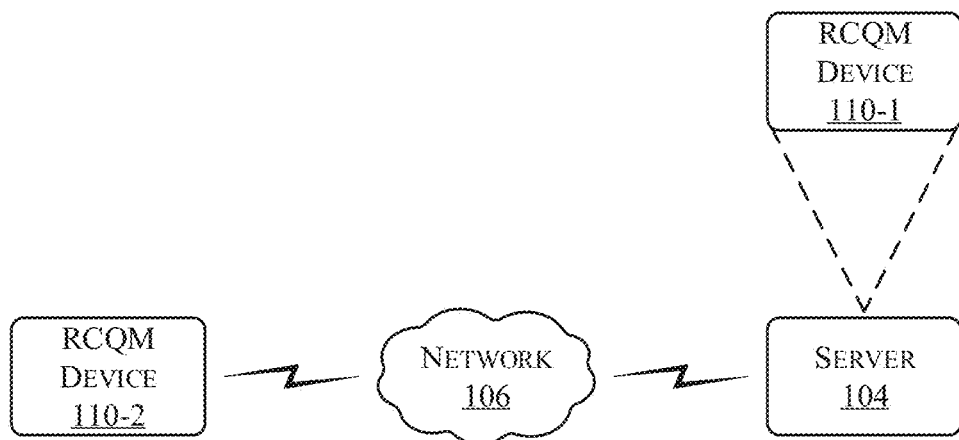
Figure 3:
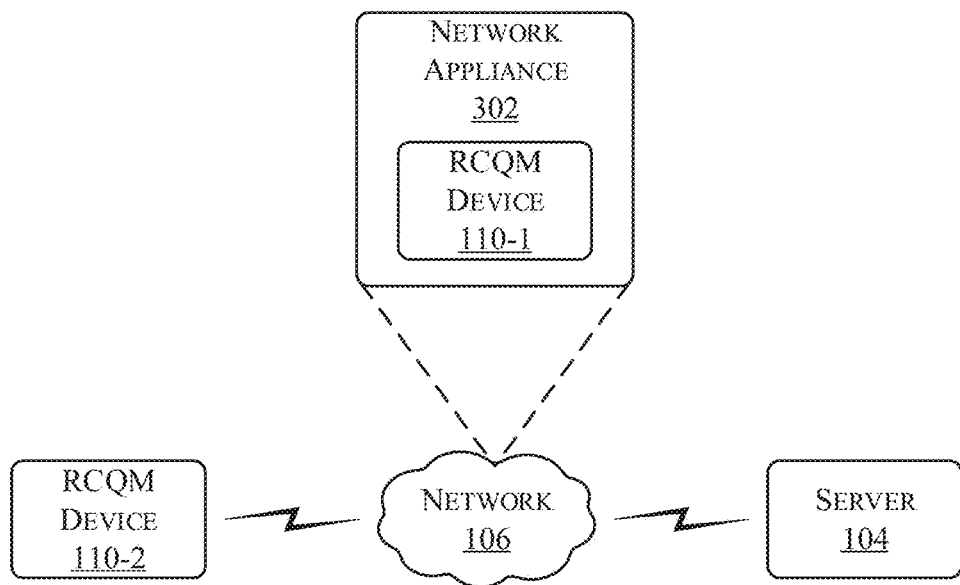
Figure 4:
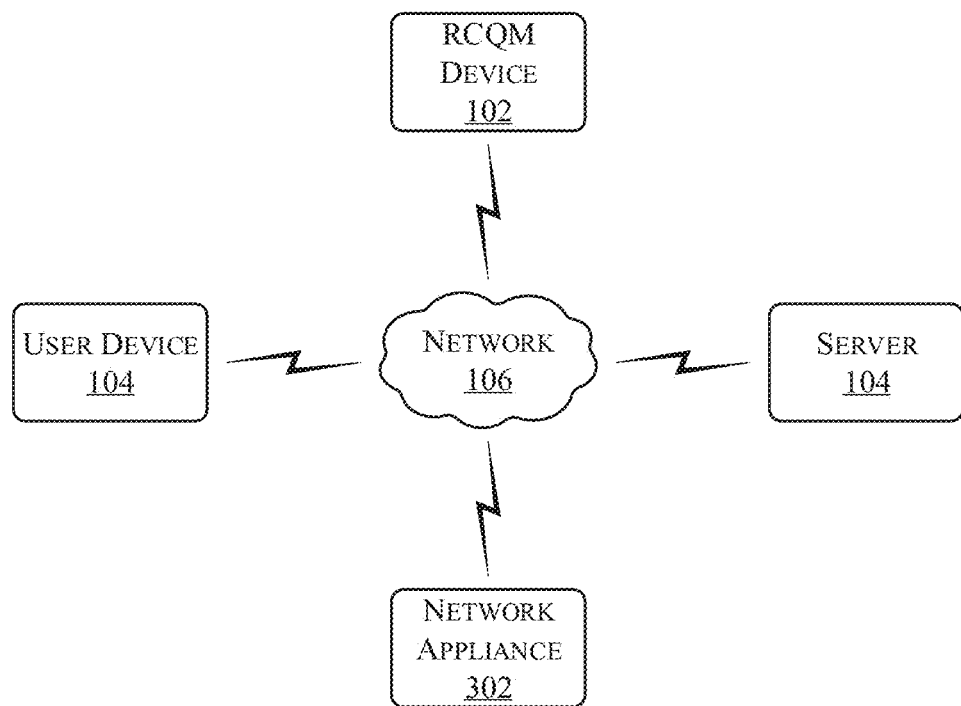

Similarly, a third embodiment (FIG. 3) may include the RCQM device 110-1 being integrated, installed, or operatively associated with a network appliance 302 such as an access point configured to establish the network 106 among the network devices such as the server 104 and the RCQM devices 110. At least one of the RCQM device 110-1 and the network appliance 302 may be capable of operating as or providing an interface to assist the exchange of software instructions and data among the network devices such as the server 104 and the RCQM devices 110. In some embodiments, the network appliance 302 may be preconfigured or dynamically configured to include the RCQM device 110-1 integrated with other devices. For example, the RCQM device 110-1 may be integrated with the server 104 (as shown in FIG. 2) or any other computing device connected to the network 106. The server 104 may include a module (not shown), which enables the server 104 for being introduced to the network appliance 302, thereby enabling the network appliance 302 to invoke the RCQM device 110-1 as a service. Examples of the network appliance 302 include, but are not limited to, a DSL modem, a wireless access point, a router, a signal repeater or enhancer, and a gateway having a predetermined computing power and memory capacity sufficient for implementing the RCQM device 110-1. Accordingly, the RCQM devices 110 may assist to implement a distributed network architecture, with or without the server 104, for executing different aspects of the RCQM device 102 of FIG. 1 separately or in tandem through various network devices such as the server 104 and the network appliance 302.

Figure 5:
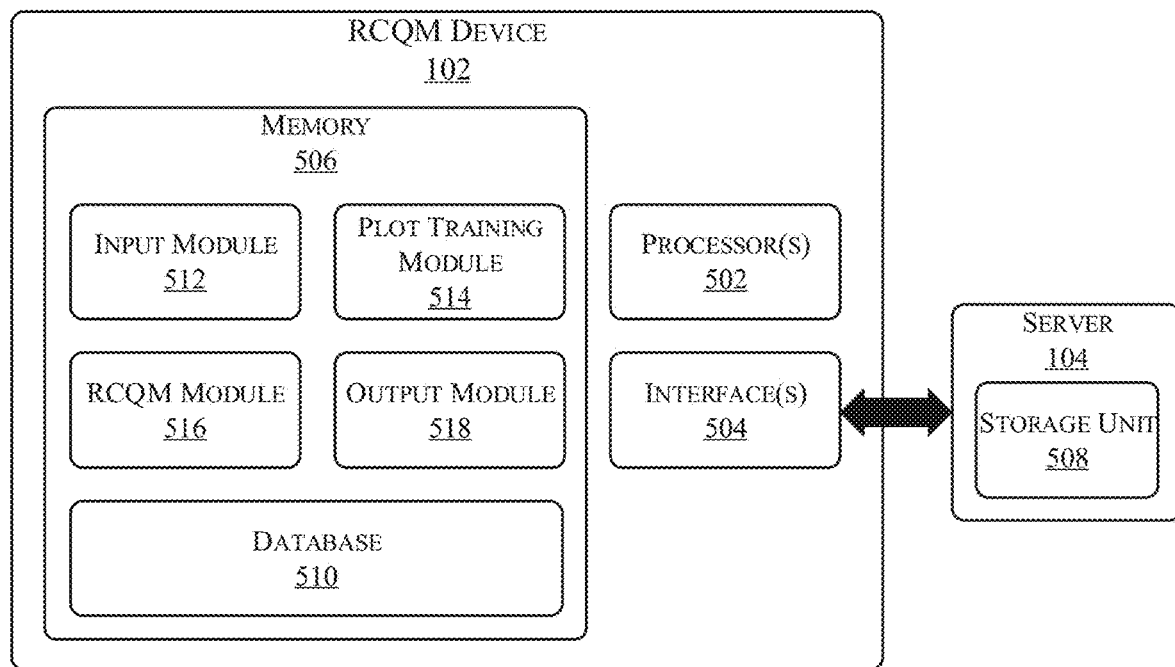
FIG. 5 illustrates the exemplary RCQM device of FIGS. 1-4, according to an embodiment of present disclosure.

Further, in a fourth embodiment (FIG. 4), the RCQM device 102 may operate as an independent, standalone device including its own processor(s), such as that shown in FIG. 5, and a transceiver unit (not shown). The RCQM device 102 may be implemented as a single dedicated device or that being a combination of multiple dedicated devices. Similar to the user device 108, the standalone RCQM device 102 may be configured for being moved or made portable to navigate across one or more surfaces or regions, which may be spatially apart in the designated physical location, or a portion thereof. In some embodiments, such surfaces or regions may be separated by a predetermined distance for the RCQM device 102, or a portion thereof, to pass therethrough. The RCQM device 102 may accordingly communicate directly with the network devices such as the user device 108, the server 104, and the network appliance 302 over the network 106 using the transceiver unit. Other embodiments may include the RCQM device 102, or aspects thereof, being implemented in a decentralized network architecture.

FIG. 5 illustrates an exemplary remote cleaning quality management (RCQM) device, according to an embodiment of present disclosure. The RCQM device 102 may be implemented by way of a single device (e.g., a computing device, a processor, or an electronic storage device) or a combination of multiple devices that may be operatively connected or networked together, such as that shown in FIGS. 2-3. The RCQM device 102 may be implemented in hardware or a suitable combination of hardware and software. In some embodiments, the RCQM device 102 may be a hardware device including processor(s) 502 executing machine readable program instructions to (1) communicate synchronously or asynchronously with one or more software applications, databases, storage devices, or appliances operating via same or different communication protocols, formats, database schemas, platforms or any combination thereof, to send and receive data pertaining to, without limitation, a geographical location; a designated physical location and/or portions thereof, and physical and non-physical characteristics associated therewith; plot points, clock times and durations such as cumulative durations; floor plans; cleaning attributes; cleaning quality; users/owners/caretakers/custodians, objects; and attributes of network devices and signals received therefrom; (2) collect, define, store, and analyze the data duration; (3) formulate one or more tasks for being performed on the data for creating a training dataset; (4) provide, execute, communicate, and assist in formulating one or more mathematical models for tasks related to identification, manipulation, and presentation of the data duration; (5) display, print, or communicate the identified, manipulated, and presentable data duration; and (6) transfer or map the data including models, tasks, attributes, and attribute values, or any combinations thereof, to one or more networked computing devices and data repositories.

The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processors such as the processor(s) 502 may include, for example, microprocessors, microcomputers, microcontrollers, digital signal processors, central processing units, state machines, logic circuits, and/or any devices that manipulate signals based on operational instructions. Among other capabilities, the processor(s) 502 may be configured to fetch and execute machine readable instructions in a dedicated or shared memory operatively associated with the RCQM device 102 for performing tasks such as signal coding, data processing, I/O processing, power control, and/or other functions.

In some embodiments, the RCQM device 102 may include, wholly or in part, a software application working alone or in conjunction with one or more hardware resources. Such software application may be executed by the processor(s) 502 on different hardware platforms or emulated in a virtual environment. Aspects of the RCQM device 102 may leverage known, related art, or later developed off-the-shelf software. Other embodiments may comprise the RCQM device 102 being in communication with a mobile switching center, network gateway system, Internet access node, application server, IMS core, service node, or any other type of communication systems, including any combinations thereof. In some embodiments, the RCQM device 102 may be integrated with or implemented as a wearable device including, but not limited to, a fashion accessory (e.g., wristbands, rings, pendants, bracelets, etc.), a utility device (e.g., hand-held batons, pens, portable speakers, watches, pen drives, shoes, etc.), a body clothing (e.g., gloves, aprons, jackets, etc.), a safety gear, or any combinations thereof.

The RCQM device 102 also includes a variety of known, related art, or later developed interface(s) 504 including software interfaces (e.g., application programming interfaces, graphical user interfaces, etc.); hardware interfaces (e.g., cable connectors, physical or digital keyboards, card readers, barcode readers, radio frequency identity (RFID) readers, biometric scanners, interactive display screens, transceiver circuits, etc.); or both. The interface(s) 504 may assist the RCQM device 102 to communicate with the network devices such as the server 104.

The RCQM device 102 may further include a memory 506 for storing, at least one of: (1) files and related data including metadata, e.g., data size, data format, creation date, associated tags or labels, images, documents, messages or conversations, etc.; (2) a log of profiles of network devices and associated communications including instructions, queries, conversations, data, and related metadata; and (3) predefined or dynamically defined, calculated, manipulated, or used mathematical models, equations, or methods for, without limitation, (i) image processing; (ii) mapping or assigning plot points; (iii) signal analysis; (iv) recording clock times and calculating durations; (v) proximity computations; (vi) creating training datasets; (vii) defining virtual fences; (viii) remotely assessing the cleaning quality; and so on.

The memory 506 may comprise any computer-readable medium known in the art, related art, or developed later including, for example, a processor or multiple processors operatively connected together, volatile memory (e.g., RAM, etc.), non-volatile memory (e.g., flash, etc.), disk drive, etc., or any combinations thereof. The memory 506 may include one or more databases such as a database 510, which may be sub-divided into further databases for storing electronic files and data. The memory 506 may have one of many database schemas known in the art, related art, or developed later for storing the data, predefined or dynamically defined models, parameters or attributes, and values thereof. For example, the database 510 may have a relational database schema involving a primary key attribute and one or more secondary attributes. In some embodiments, the RCQM device 102 may perform one or more operations including, but not limited to, reading, writing, deleting, indexing, segmenting, labeling, updating, and manipulating the data, or any combinations thereof, and may communicate the resultant data to various networked computing devices. In one embodiment, the memory 506 may include various modules such as an input module 512, a plot training module 514, an RCQM module 516, and an output module 518. The operations of these modules are described below majorly in the context of Wi-Fi signals projected from wireless access points (WAPs) within indoor locations; however, one having ordinary skill in the art would understand that the RCQM device 102 or any of modules operatively associated therewith may be configured to operate with any of a variety of types of signals (e.g., radiofrequency (RF) signals, light signals, sound signals, etc.) or communication technology standards (e.g., Li-Fi, Bluetooth®, Zigbee®, etc.) suitable for remote localization at the designated physical locations, or portions thereof.

Input Module

Figure 6:
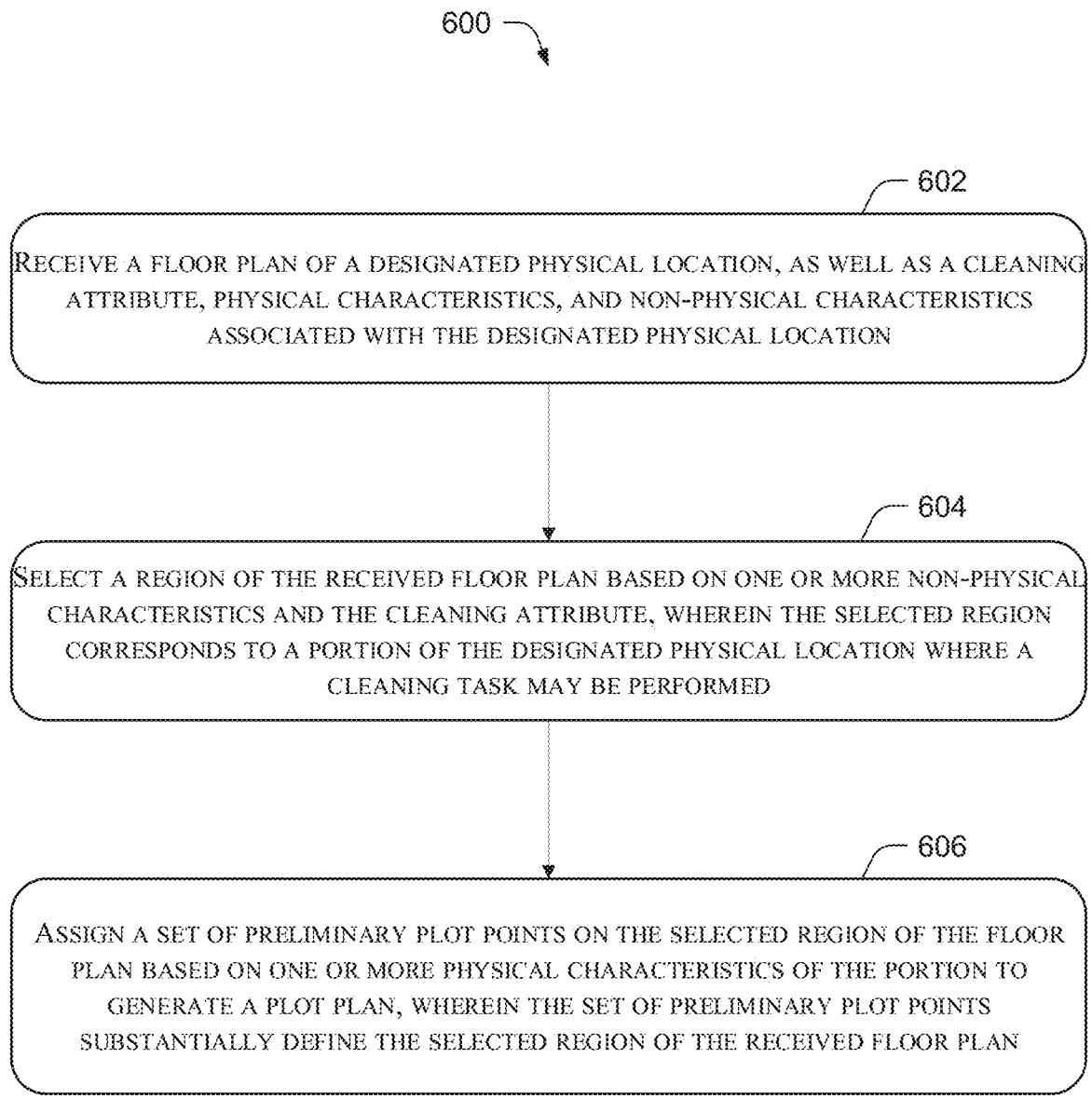
FIG. 6 illustrates an exemplary method for implementing an input module of the RCQM device of FIG. 5, according to an embodiment of the present disclosure.

The input module 512 may communicate with the network devices via the interface(s) 504 over the network 106. In one embodiment, the input module 512 may implement an exemplary method 600 illustrated in FIG. 6 in communication with the network devices. The order in which the method 600 is described is not intended to be construed as a limitation, and any number of the described method blocks may be combined, deleted, or otherwise performed in any order to implement the method 600 or an alternate method without departing from the scope and spirit of the present disclosure. The exemplary method 600 may be described in the general context of computer-executable instructions, which may be stored on a computer readable medium, and installed or embedded in an appropriate device for execution. Further, the method 600 may be implemented in any suitable hardware, software, firmware, or combination thereof, that exists in the related art or that is later developed.

At step 602, a floor plan of a designated physical location may be received. In one embodiment, the input module 512 may be preconfigured or dynamically configured to receive one or more inputs including a floor plan from a storage unit such as the storage unit 508 located on the server 104; however, one of skill in the art would understand that the floor plan may be located or accessed on a standalone storage device or any other network devices. In some embodiments, the floor plan or a portion thereof may be stored in a local database such as the database 510 and fetched by the input module 512 as required. In one example, the floor plan may be a scale digital diagram of the designated physical location such as an arrangement of rooms within a building (e.g., airport, restaurant, etc.), which may be indicative of a geographical location.

Along with the floor plan, the input module 512 may also receive a set of predefined basic and/or extended physical characteristics (hereinafter, collectively referred to as physical characteristics) and non-physical characteristics of the designated physical location or a portion thereof. In some embodiments, the physical characteristics and the non-physical characteristics may be associated with the floor plan. Examples of the non-physical characteristics may include, but are not limited to, a room number, a room name, a floor number, a building name, a department name, or any other aspect that may provide a reference to an intended portion of the designated physical location. Examples of the basic physical characteristics may include, but are not limited to, (1) dimensions such as length, breadth, height, and area; (2) boundaries, or partitions therein, such as walls, doors, and windows; and (3) entry and exit points such as doors. Further, examples of the extended physical characteristics may include, but are not limited to, (1) tangible objects within the designated physical location such as (i) chattel (e.g., furniture such as chairs, sofas, utility and gaming tables, floor lamps, and garbage bins; kitchen appliances such as cooking ranges and coffee machines; electronic devices such as television, desktops, electronic worksurfaces, photocopiers, and landline phones; utility items such as vending machines, water dispensers, ladders, and vacuum cleaners; decorative pieces such as aquariums, indoor plants, and paintings; movable carriers for goods and living beings such as motorized or non-motorized vehicles, wheelchairs, strollers, and containers, including parts (e.g., ramps, cushions, tires, etc.) capable of being used with the movable carriers; etc.), (ii) fixtures such as lamp shades, sinks, urinals, cupboards, closets, counters, fire hydrants, manholes, etc.), (iii) fittings (e.g., carpets, curtains, blinds, mirrors, faucets, etc.); (2) physical pathways or surfaces adjacent or in-between the tangible objects; (3) spatial arrangement indicators (e.g., number, types, dimensions, and geometries of the tangible objects including any openings therein or parts thereof; relative distances of the tangible objects from each other or from proximate/neighboring regions such as restrooms, entry and/or exit points, stairs, and elevators, or any portions thereof; etc.); and so on. Furthermore, the input module 512 may receive one or more cleaning attributes associated with the designated physical location, or a portion thereof. Examples of the cleaning attributes may include, but are not limited to, (i) a cleaning schedule, (ii) a cleaning task or a type thereof, (iii) a cleaning product, (iv) a cleaning equipment, (v) a proximity of the designated physical location, or a portion thereof, from a user or a predefined area (e.g., restrooms, entry/exit points, etc.) proximate to the designated physical location, (vi) a clock time or a preset period, or any combinations thereof. Examples of the cleaning product may include any type (e.g., contact-based, contactless, organic, inorganic, etc.) of cleaning, disinfecting, or sterilizing agent known in the art, related art, or developed later including all-purpose cleaners, dishwashing agents, fabric cleaners or softeners, floor cleaners, ultraviolet light-based surface cleaners, toilet or drain cleaners, metal cleaners, and so on.

Other embodiments may include the input module 512 additionally determining GPS coordinates of a geographical location indicating the designated physical location. For example, the input module 512 may record GPS coordinates at various points along a boundary of the geographical location such that a contour joining these GPS points may define a geofence. In one example, such geofence may be defined as an imaginary circle having a center corresponding to latitude and longitude coordinates of a street address of the geographical location such as an airport building, where the imaginary circle may have a radius equivalent to a set value based on the size of the geographical location. These GPS coordinates may be stored in the database 510 or a storage device such as the storage unit 508 and accessed by the input module 512 as required. In one embodiment, the input module 512 may also determine the availability of the RCQM device 102 at the geographical location based on a GPS location of the RCQM device 102 being within an area defined by the geofence (hereinafter referred to as geofence area). The input module 512 may also record the clock times and durations for which the RCQM device 102, and/or an associated cleaning entity, may be available within the geofence area at the geographical location.

At step 604, the input module 512 may select a region of the floor plan corresponding to a portion of the designated physical location. In one embodiment, the floor plan may include or indicate an arrangement of rooms on a storey of a building, in which a region of the floor plan may be selected. In one example, the region may correspond to a specific room on that storey where a cleaning task may be performed. The input module 512 may select the region based on the non-physical characteristics of the corresponding designated physical location and/or the one or more cleaning attributes. The selected region may correspond to a designated cleaning location defined by the associated non-physical characteristics and the cleaning attributes. Some embodiments may include the input module 512 selecting such region of the floor plan based on a user input.

At step 606, the input module 512 may assign a set of preliminary plot points in the selected region of the floor plan to generate a plot plan. In one embodiment, the input module 512 may assign the preliminary plot points on the selected region based on the one or more physical characteristics of the corresponding designated physical location. In one instance, the input module 512 may assign the preliminary plot points based on boundaries, and/or partitions, of the designated physical location indicated in the selected region of the floor plan. In another instance, the input module 512 may be configured to identify the boundaries and/or partitions in the selected region using any of a variety of computer vision and machine learning methods known in the art, related art, or developed later based on various aspects including, but not limited to, shape, size, texture, and color or any other aspects of image objects indicated in the floor plan. Examples of the computer vision methods may include, but are not limited to, region-based image segmentation methods (e.g., threshold segmentation, region growth segmentation, etc.); edge detection methods (e.g., Sobel operator, Laplacian operator, etc.); and so on. Examples of the machine learning methods may include, but are not limited to, supervised learning methods (e.g., Gaussian process regression, Naive Bayes classifier, conditional random field, convolutional neural networks, etc.); unsupervised learning methods (e.g., expectation-maximization algorithm, vector quantization, generative topographic map, information bottleneck method, etc.); and semi-supervised learning methods (e.g., generative models, low-density separation, graph-based methods, heuristic approaches, etc.). In some instances, the boundaries and/or partitions may be pre-marked on the floor plan using tags, or any other metadata, for being identified by the input module 512.

Once the boundaries, and/or partitions are identified, the input module 512 may assign the preliminary plot points proximate to the boundaries, and/or partitions, indicated in the selected region. In one embodiment, each of the assigned preliminary plot points may have a shortest relative distance from a specific preliminary point, or any image object or feature, indicated in the selected region. For example, the preliminary plot points may be placed along the boundaries with each preliminary plot point at a shortest relative distance from a corner, or a first preliminary plot point, within the selected region of the floor plan. In some embodiments, the assigned preliminary plot points may substantially define the selected region of the floor plan. For example, a set of the assigned preliminary plot points may substantially enclose the selected region of the floor plan. Similarly, in another example, the preliminary plot points may be placed along one or more partitions in, or proximate to, a boundary such that each of those preliminary plot points may be at a shortest relative distance from a closest preliminary plot point, which may be located along that boundary of the selected region. In some embodiments, the input module 512 may assign the preliminary plot points at a predefined distance from each other as well as the boundaries and/or partitions. In one instance, the predefined distance between any two consecutive preliminary plot points may be same or different from that between any other two or more consecutive preliminary plot points. In another instance, such predefined distance may be zero for the consecutive preliminary plot points being in contact with each other, thereby creating a continuous trail.

Other embodiments may include these preliminary plot points being, additionally or alternatively, preassigned to the selected region by a user in accordance with the one or more physical characteristics of the designated physical location, or the cleaning attributes, or both. For example, the preliminary plot points may be preassigned to those areas of the selected region that may represent obscured surfaces, or a part thereof, within the corresponding designated physical location. Such obscured surfaces may refer to surfaces or regions which may be beyond the field of view of or a preset distance from a hypothetical user at a predefined or intended location (e.g., a shared pathway) within the designated physical location. Examples of the obscured surfaces may include, but are not limited to, an underside of a table, a surface underneath a couch, a top surface of a bookshelf, a constricted area behind a door, etc. Therefore, the preliminary plot points may represent virtual reference points that may advantageously assist to (i) remotely identify optimum portions of a designated physical location on the floor plan where performing a cleaning task may be required to achieve a desired cleaning quality at that designated physical location; (ii) identify physically accessible and/or inaccessible surfaces or regions of the designated physical location on the floor plan; (iii) improve the accuracy of mapping or defining the designated physical location on the floor plan; and (iv) define a virtual fence across the designated physical location.

Further, the input module 512 may select more regions, if desired, of the floor plan in a manner discussed above to identify or assign the preliminary plot points and generate a plot plan, which may be indicative of a distribution of the preliminary plot points on the floor plan. Like the floor plan, the plot plan may be produced in a variety of formats including, but not limited to, a two-dimensional (2D) or a three-dimensional (3D) interactive pictorial imagery, a virtual model, a mathematical representation, a graph, or any combinations thereof compatible with other modules and devices. The plot plan, the set of assigned preliminary plot points, the associated physical and non-physical characteristics, and the cleaning attributes may be communicated to the plot training module 514, and/or stored in a database such as the database 510 or the storage unit 508, using the input module 512.

Plot Training Module

The plot training module 514 may operate in communication with various modules such as the input module 512, the RCQM module 516, and the output module 518, as well as network devices such as the server 104 and the network appliance 302. However, in some instances, aspects of the plot training module 514 may be implemented on a network device such as the network appliance 302. In one embodiment, the plot training module 514 may implement an exemplary method 700 illustrated in FIG. 7. The order in which the method 700 is described is not intended to be construed as a limitation, and any number of the described method blocks may be combined, deleted, or otherwise performed in any order to implement the method 700 or an alternate method without departing from the scope and spirit of the present disclosure. The exemplary method 700 may be described in the general context of computer-executable instructions, which may be stored on a computer readable medium, and installed or embedded in an appropriate device for execution. Further, the method 700 may be implemented in any suitable hardware, software, firmware, or combination thereof, that exists in the related art or that is later developed.

At step 702, a plot plan and a set of preliminary plot points associated therewith may be accessed. In one embodiment, the plot training module 514 may receive the plot plan and the associated set of preliminary plot points from the input module 512. However, in some embodiments, the plot training module 514 may access the plot plan or the preliminary plot points from the database 510 or the storage unit 508 on the server 104 over the network 106. Other embodiments may include the plot training module 514 accessing the plot plan or the set of preliminary plot points from a standalone storage device or any networked devices.

At step 704, a predefined signal received from at least one fixed network device may be scanned. The plot training module 514 may be configured to scan for signals received from at least one spatially fixed network device (or simply, fixed network device) when the RCQM device 102 may be proximate to the designated physical location represented by the plot plan. The fixed network device may refer to any network device or appliance that may be fixed, or movably fixed, to a predefined physical region and configured to establish a network (e.g., network 106) with the RCQM device 102 being proximate to the designated physical location. One of skill in the art would understand that portable network devices (e.g., RF beacons, mobile phones, etc.) capable of establishing a network with the RCQM device 102 may also be spatially fixated for the purposes of being used as the fixed network device.

Further, the proximity to the designated physical location may be determined based on (i) a user input, (ii) detectable signals received from the fixed network device, or (ii) a trigger provided by any suitable sensor associated with either the designated physical location or the RCQM device 102. The sensor may be a signal sensor, or a proximity sensor, configured for triggering the plot training module 514 to initiate the signal scanning based on the RCQM device 102 being proximate to the designated physical location. In some instances, the plot training module 514 may additionally or alternatively define a scanning proximity based on a variety of factors including, but not limited to, the number and types of available network devices and the signals received therefrom, the strength of received signals relative to a predefined signal threshold value, and computational delays. For example, the plot training module 514, or the RCQM device 102, may be configured to increase the scanning proximity if (1) only one network device such as an access point is detected to be available; (2) the strength of signals received from a predefined number of network devices is either below the predefined signal threshold value or are not stable for a predetermined amount of time; (3) more than half of the predefined number of network devices are repeaters or mobile hotspots; or (4) at least one fixed network device providing stable signals is unavailable; and so on. In another example, the plot training module 514 may decrease the scanning proximity if the number of available network devices adversely affect the intended computational complexity, accuracy, or cause delay.

In one embodiment, the plot training module 514 may be preconfigured or dynamically configured to scan for a predefined signal received from at least one fixed network device. For example, the plot training module 514 may scan for radiofrequency signals such as Wi-Fi signals from a network device such as a fixed wireless access point. Further, the Wi-Fi signals may comprise of one or more signal samples, each being in the form of packets. Each signal sample may be associated with a network device identifier (ID) such as a basic service set identifier (BSSID) value indicative of the media access control (MAC) address of a wireless access point, e.g., the network appliance 302, which generated that signal sample.

Another example may include the plot training module 514 being configured to scan for light signals from at least one fixed network device including a light source such as a pulsed light source, a continuous light source, or a set of both the pulsed and the continuous light sources. The pulsed light source may be configured by a control device (not shown) to emit pulses of light of a predetermined energy intensity, power, or dose within a predefined or dynamically defined wavelength range. In some embodiments, the pulsed light source may be configured by the control device to have a pulse frequency and/or pulse duration that may cause the emitted pulsed light to appear as continuous to a human eye. On the other hand, the continuous light source may be configured by the control device to emit a continuous stream of light. In some embodiments, the continuous light source may be turned on and off at a predetermined frequency by the control device to emit pulses of light. Any of such light sources may be designed as a bulb, a light emitting diode (LED), a gas discharge lamp, or any other types known in the art, related art, or developed later, or any combination thereof. The plot training module 514 may be configured with any suitable software and hardware for receiving the light-conveyed information based on light characteristics (e.g., wavelength, intensity, power, dose, pulse frequency, pulse width, etc.). For example, the plot training module 514 may operate in communication with a silicon photodiode for receiving a pulsed visible light signal from a bulb based on the IEEE 802.15.7 communication standard. One of skill in the art would understand that any other suitable types of light detectors known in the art, related art, or developed later including photoconductors (photoresistors), photovoltaic devices (photocells), phototransistors, and photodiodes may be used. Each pulse of the pulsed visible light signal may include or indicate, without limitation, device ID of the light source and characteristics of the light signals received therefrom.

Yet another example may include the plot training module 514 being configured to scan for sound signals from at least one fixed network device including a sound source. The sound signals may include, but are not limited to, audible signals, inaudible sound signals, vibrational waves (e.g., longitudinal waves, transverse waves, surface waves, etc.), electromagnetic hum, sound patterns (e.g., alliteration, assonance, onomatopoeia, rhythmic, non-rhythmic, etc.), background noises, or any combinations thereof. Examples of the sound source may include, but are not limited to, sound-based access points, speakers, low-voltage and battery-operated sound devices capable of producing a sound (e.g., mobile phones, beacons, sound beepers, etc.), electronic devices (e.g., television, ovens, refrigerators, printers, vacuum cleaners, servers, ultraviolet (UV) disinfection devices, etc.), powered electronic components (e.g., wires, capacitors, regulators, bulbs, etc.), living organisms or any other natural sound sources such as flowing water and wind, or any combinations thereof. The plot training module 514 may be configured with any suitable software and hardware for receiving any information conveyed by a sound signal based on its sound characteristics (e.g., wavelength, amplitude, time-period, frequency, velocity or speed, pattern, harmony, timbre, etc.). For example, the plot training module 514 may operate in communication with a microphone for receiving pulses of a sound signal or sound signals received at certain intervals. Each pulse or stream of the sound signals may include or indicate, without limitation, device ID of the sound source and the sound characteristics of signals received therefrom.

At step 706, at least one fixed network device may be identified as available based on the scanned signal being a stable signal. In one embodiment, the plot training module 514 may be preconfigured or dynamically configured to determine the scanned signal as being a stable signal if a predefined number of signal samples or pulses are received for a predetermined amount of time from at least one fixed network device, provided the strengths of signals, or samples thereof, are above a predefined signal threshold value. For example, the plot training module 514 may receive RF signals such as Wi-Fi signals from a fixed wireless access point (WAP). Each pulse or a stream of the Wi-Fi signals may be received as a signal sample from the fixed WAP. The received Wi-Fi signal samples may include a received-signal-strength-indication (RSSI) value indicative of its signal strength. If the RSSI value of a predefined number of signal samples (e.g., at least two samples) may be above a predefined signal threshold value (e.g., −70 decibel-milliwatt (dBm)) for a predefined signal duration (e.g., one millisecond), the plot training module 514 may determine the received Wi-Fi signal as a stable signal. Accordingly, the fixed network device such as the fixed WAP (e.g., network appliance 302) generating the stable signal may be identified as being available. The predefined signal threshold value may have any value ranging from −70 dBm to −10 dBm. However, one of skill in the art would understand that the RSSI value and the predefined signal threshold value may be equivalently represented in any other suitable measurement units depending on the type of network devices providing the signals. The predefined signal duration value may range from approximately one picosecond to approximately one second.

At step 708, one or more signal plot points may be mapped on the plot plan. In one embodiment, the plot training module 514 may map or assign one or more signal plot points on the plot plan based on the received stable signal. Each signal plot point may be indicative of a physical spot in the designated physical location where the stable signal is received. Further, the plot training module 514 may map the signal plot points relative to the preliminary plot points. For example, the plot training module 514 may assign a signal plot point proximate to a preliminary plot point on the plot plan if the stable signal is received at a physical spot, which corresponds to the preliminary plot point or may be located within a predefined distance (e.g., at least approximately one foot or approximately 0.3 meters) therefrom. In another example, the plot training module 514 may assign the signal plot point proximate to a preliminary plot point if a stable signal is not received at a physical location corresponding to that preliminary plot point. Accordingly, the plot training module 514 may assign a signal plot point for another physical spot, which may be within a predefined distance (e.g., at least approximately one foot or approximately 0.3 meters) from the physical location corresponding to the preliminary plot point, provided the stable signal is received at that another physical spot. Such two-step placement of the signal plot points based on a verification of (i) stable signals being received at a physical spot, and (ii) proximity to a preliminary plot point indicating another physical spot where the stable signals are received, may assist to identify physical spots within the designated physical location that may be easy to track, relevant, accessible, or inaccessible for being cleaned. Accordingly, in one instance, the signal plot points may be mapped proximate to the preliminary plot points assigned along a boundary of the designated physical location or a portion thereof such as the designated cleaning location. These signal plot points proximate to the boundary may define an indoor virtual fence substantially enclosing the designated physical location, or a portion thereof. Further, the plot training module 514 may assign additional signal plot points within a predefined distance (e.g., at least approximately 0.5 meters) from a corresponding closest signal plot points, which may be assigned relative to the preliminary plot points. In some embodiments, these additional signal plot points may be assigned at a same or different predefined distance from each other. Other embodiments may include the plot training module 514 continue assigning the signal plot points on the plot plan until a physical space indicated by the assigned signal plot points covers a substantial portion or a selected portion of the designated physical location.

In some embodiments, a distance from an assigned signal plot point to (i) another signal plot point, (ii) a preliminary plot point, or (iii) a physical characteristic such as a boundary indicated on the plot plan may be measured based on a corresponding distance between their respective physical spots within the designated physical location. Such distance, with or without direction, may be measured using any of a variety of physical methods and/or computer vision methods known in the art, related art, or developed later. Examples of the computer vision methods may include any of the existing or future methods such as those mentioned above. The computer vision methods may be implemented with any suitable hardware such as a camera, a light-based circuitry (e.g., infrared sensor circuitry), and a sound-based circuitry (e.g., ultrasonic sensor circuitry, altimeter, etc.) for measuring the distance. Examples of the physical methods may include, but not limited to, step count or step length measurement (e.g., using a pedometer), assessment of relative change in magnetic field (e.g., using a magnetometer), and so on. In some embodiments, these physical methods and/or computer vision methods in combination with any suitable hardware may also assist in defining indoor location coordinates for the signal plot points and/or the cleaning entity.

When such signal plot points are assigned, the plot training module 514 may record an identifier (e.g., BSSID value) of the network device (e.g., WAP) from which the stable signals may be received at the physical spots corresponding to the assigned signal plot points. Similarly, the plot training module 514 may update the plot plan to indicate one or more signal plot points therein. In one embodiment, the plot training module 514 may be configured to append the signal plot points on the plot plan without removing the existing preliminary plot points. However, in some embodiments, the plot training module 514 may remove the preliminary plot points after the signal plot points are mapped or assigned. Therefore, the signal plot points may represent virtual reference points that may advantageously assist to (i) reduce hardware costs vis-à-vis powered or active beacons, (ii) remotely identify physical spots of interest at an indoor location independent of the geographical location and related aspects such as GPS coordinates, (iii) avoid being defined based on plot point clustering or signal broadcasts from the physical spots of interest, and (iv) define an indoor virtual fence proximate to the physical spots of interest within the designated physical location.

At step 710, a training dataset may be created. In one embodiment, the plot training module 514 may create a training dataset based on (i) the mapped one or more signal plot points, (ii) the stable signals received at the mapped one or more signal plot points, and (iii) the at least one fixed network device providing the stable signal. For example, the training dataset may include an entry having a plot point identifier (e.g., a reference number, an indoor location coordinates, etc.) of a signal plot point, a signal identifier such as the strength (e.g., RSSI value) of the stable signal received at a physical spot indicated by the signal plot point, and a network device identifier (e.g., BSSID value) indicating a network device providing the stable signal. In some embodiments, the entry may also include geographical location coordinates associated with the designated physical location for which the training dataset may be created. The training dataset and the plot plan appended with the assigned signal plot points, hereinafter referred to as a signal plot plan, may be communicated to the RCQM module 516 and/or stored in the database such as the database 510 or a storage device such as the storage unit 508 using the plot training module 514.

RCQM Module

The RCQM module 516 may communicate with various modules such as the input module 512, the plot training module 514, and the output module 518, as well as network devices such as the server 104 and the network appliance 302. In one embodiment, among various functionalities, the RCQM module 516 may be preconfigured or dynamically configured to, at least one of, (1) identify a position of the RCQM device 102 at a designated physical location relative to a set of selected signal plot points; (2) determine an amount of time spent at the identified position based on a predefined cleaning schedule; (3) determine a cleaning quality for the designated physical location or a portion thereof based on the determined amount of time spent at the identified position; and (4) communicate the determined amount of time, and the cleaning quality to the output module 518. However, aspects of the RCQM module 516 may also be implemented on a network device such as the server 104.

Figure 8:
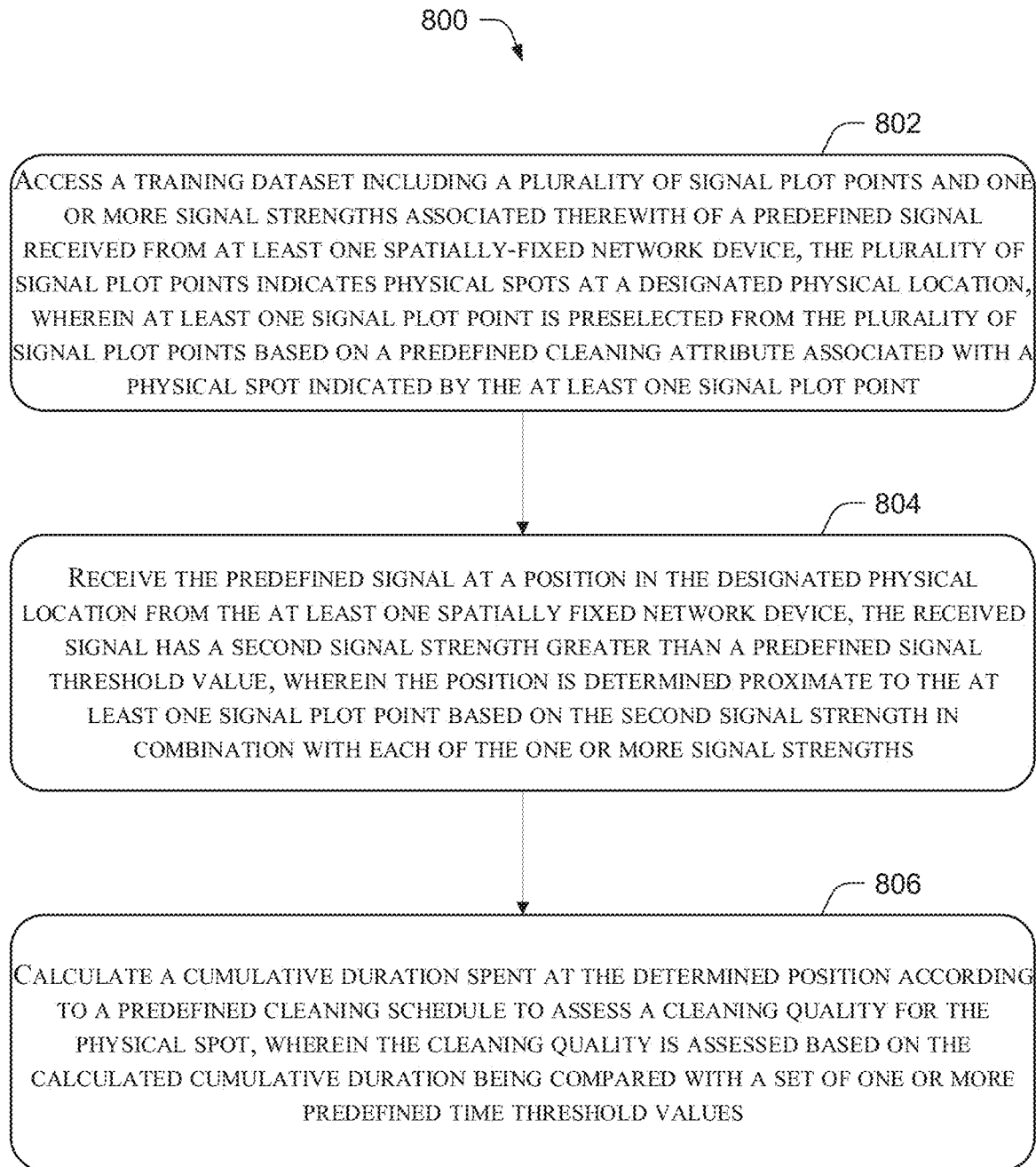
FIG. 8 illustrates an exemplary method for implementing an RCQM module of the RCQM device of FIG. 5, according to an embodiment of the present disclosure.

In one embodiment, the RCQM module 516 may implement an exemplary method 800 illustrated in FIG. 8 according to an embodiment of the present disclosure. The order in which the method 800 is described is not intended to be construed as a limitation, and any number of the described method blocks may be combined, deleted, or otherwise performed in any order to implement the method 800 or an alternate method without departing from the scope and spirit of the present disclosure. The exemplary method 800 may be described in the general context of computer-executable instructions, which may be stored on a computer readable medium, and installed or embedded in an appropriate device for execution. Further, the method 800 may be implemented in any suitable hardware, software, firmware, or combination thereof, that exists in the related art or that is later developed.

At step 802, a training dataset including a plurality of signal plot points and one or more signal strengths associated therewith of a predefined signal may be accessed. In one embodiment, the RCQM module 516 may access the training dataset from the database 510 or a storage device such as the storage unit 508; however, the training dataset may be received on-the-fly from the input module 512 or the plot training module 514. The training dataset may include a set of parameters corresponding to discrete positions in a designated physical location. For example, the training dataset may include one or more signal plot points, each being indicated by a plot point identifier (e.g., numeric or alphanumeric values, special characters, binary or hexadecimal codes, etc.). Each of the signal plot points may be assigned on a signal plot plan and correspond to a physical spot at a designated physical location, or a portion thereof. The training dataset may also include a set of signal identifiers such as signal strengths (e.g., RSSI values), of a predefined signal associated with at least one of the signal plot points. The predefined signal may include a radiofrequency signal, a light signal, a sound signal, or any combinations thereof. For example, the predefined signal may be a Wi-Fi signal. Further, the training dataset may include a network device identifier (e.g., BSSID values) indicating at least one fixed network device providing stable signals (e.g., stable Wi-Fi signals) received at the one or more signal plot points.

Similarly, the training dataset may be accessed by the server 104 for performing one or operations in communication with the RCQM device 102. One of skill in the art would understand that aspects of the server 104 described in the present disclosure may be performed using the RCQM device 102, or any modules thereof in communication, wholly or in-part, with or without the server 104. For example, all aspects of the server 104 may be performed or implemented independently using the RCQM device 102 or any module operatively associated therewith. In one embodiment, the server 104 may select at least one signal plot point based on one or more cleaning attributes associated with a designated cleaning location in the designated physical location. For example, the server 104 may select a signal plot point corresponding to a physical spot at the designated cleaning location, where the physical spot may be proximate to predefined areas of interest such as entry and exit points. In another example, the server 104 may select a signal plot point corresponding to a physical spot being proximate to a predefined object such as a television to be cleaned at the designated cleaning location. In yet another example, the server 104 may select a signal plot point corresponding to a physical spot in accordance with an associated cleaning schedule. In still another example, the server 104 may select a signal plot point corresponding to a physical spot being assigned or associated with a cleaning entity such as a cleaning staff and a cleaning equipment, or just any device in general. In a further example, the server 104 may select a signal plot point corresponding to a physical spot indicated or designated as a high-activity zone. In another example, the server 104 may select a signal plot point corresponding to a physical spot required to be cleaned continuously for a specific duration or at dynamically set clock times. Other examples may include a signal plot point being selected based on a user input. The selected plot point, and aspects thereof, may be stored in the storage unit 508 or communicated to the RCQM module 516 by the server 104. The selected plot point may assist in ensuring that an intended portion of the indoor location may be attended by the RCQM device 102 operatively associated with a cleaning entity.

At step 804, a predefined signal may be received at a position in the designated physical location from the at least one fixed network device. In one embodiment, the RCQM module 516 in communication with suitable hardware may scan a predefined signal received from at least one fixed network device. The predefined signal as well as the at least one fixed network device may be one of those used to create the training dataset. For example, the RCQM module 516 in communication with a suitable hardware (e.g., an RF detector) may be configured to scan for Wi-Fi signals from the network appliance 302. However, one of skill in the art would understand that other suitable hardware known in the art, related art, or developed later may be used depending on the type of signal being received.

Figure 7:
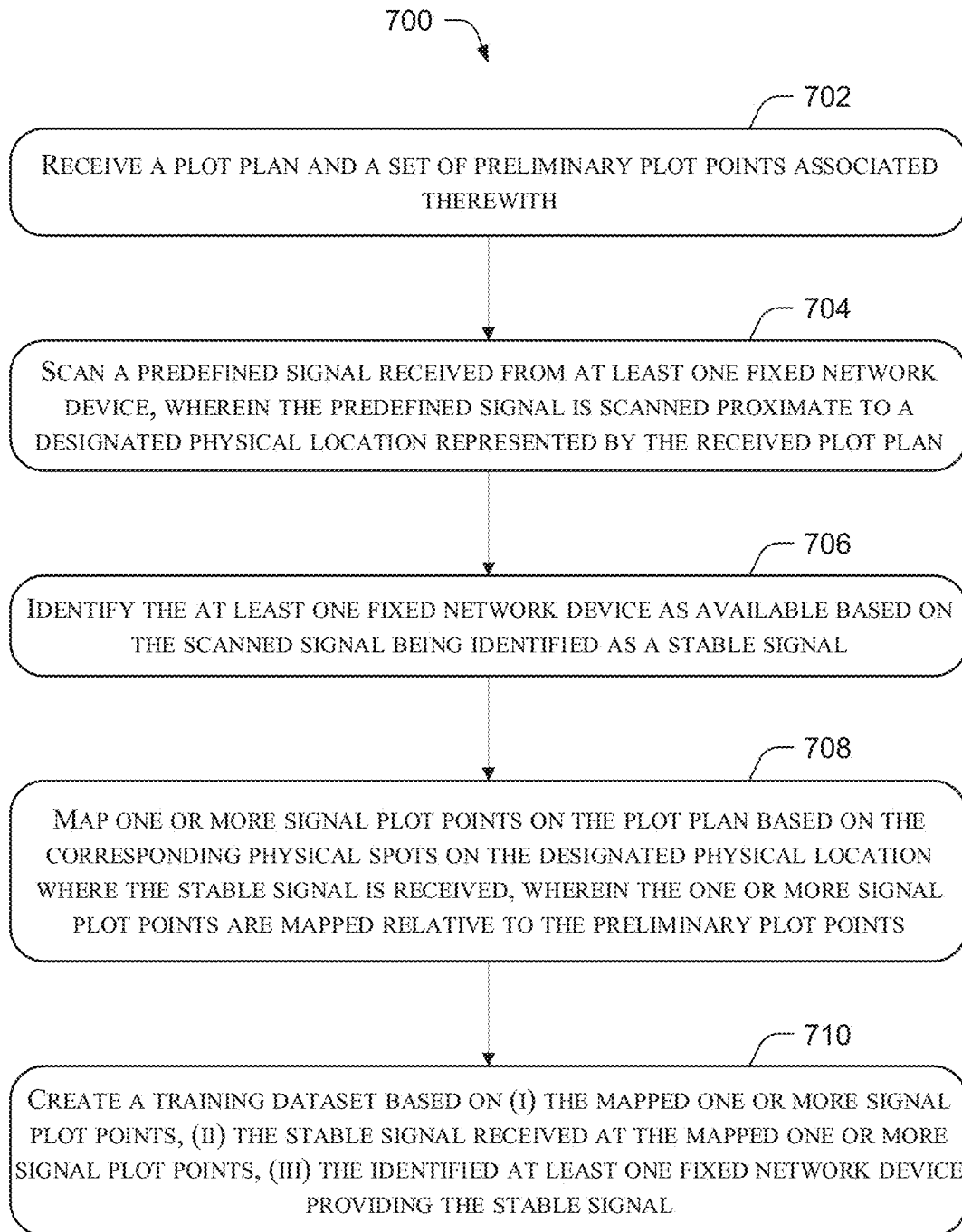
FIG. 7 illustrates an exemplary method for implementing a plot training module of the RCQM device of FIG. 5, according to an embodiment of the present disclosure.

Further, similar to the step 706 of FIG. 7 discussed above, the RCQM module 516 may be configured to determine the received predefined signal as a stable signal if a predefined number of signal samples or pulses may be received for a predetermined amount of time from the fixed network device, provided the signal strength of each of those samples or pulses may be above a predefined signal threshold value. For example, the RCQM module 516 in communication with an RF detector may detect Wi-Fi signals received from the fixed WAP. Each sample of the Wi-Fi signals may include an RSSI value indicative of its signal strength. In one embodiment, the RCQM module 516 may be configured to determine the received Wi-Fi signal as a stable Wi-Fi signal if each of a predefined number of Wi-Fi signal samples (e.g., at least two samples) may have an RSSI value above a predefined signal threshold value (e.g., −70 dBm) for a predetermined amount of time (e.g., one millisecond). Examples of the predefined signal threshold value may include any value being −70 dBm or above, e.g., −70 dBm, −67 dBm, −60 dBm, −50 dBm, −20 dBm, −10 dBm, etc. based on (i) a type of received predefined signal, and/or (ii) a signal reliability required depending on a distance between the network device and the RCQM device 102. In some embodiments, larger the distance, greater may be the signal loss, thereby requiring a relatively higher signal threshold value. Upon determining the received predefined signal such as the Wi-Fi signal as the stable signal, the RCQM module 516 may record a second signal strength (e.g., an RSSI value) of the received predefined signal for being used to determine a relative position of the RCQM device 102 at the designated cleaning location. The recorded RSSI value or the second signal strength may be stored in the database 510, or the storage unit 508, or communicated directly to the server 104 using the RCQM module 516.

The server 104 may receive the second signal strength from the RCQM module 516, the database 510, or the storage unit 508. The server 104 may use the determined signal identifier such as the second signal strength in combination with each of a set of first signal strengths in the received training dataset to determine the relative position of the RCQM device 102 using any of a variety of supervised, semi-supervised, or unsupervised learning methods known in the art, related art, or developed later including, but not limited to, random forest identifier, and so on. In one embodiment, the server 104 may be configured to employ the K-nearest neighbor (KNN) method to determine the relative position of the RCQM device 102. According to the KNN method, the server 104 may compute and compare Euclidean distances between the second signal strength (e.g., a received RSSI value of the stable signal received from the fixed wireless access point) and each of the first signal strengths (e.g., the RSSI values, stored in the training dataset). For example, a Euclidean distance $D_i$ may be computed based on equation 1:

$$D_i = \sqrt{\sum_{j=1}^{n} (RSSI_{ij} - RSSI_j)^2} \quad (1)$$

where:
$D_i$=Euclidean distance
$RSSI_{ij}$=RSSI values stored in the training dataset;
$1 \leq i \leq$ no. of RSSI values in training dataset
$RSSI_j$=RSSI value received from a network device;
$1 \leq j \leq$ no. of network devices Based on the comparison, the server 104 may determine a stored RSSI value in the training dataset for which the calculated Euclidean distance $D_i$ with the received RSSI value is the shortest. This stored RSSI value providing the shortest Euclidean distance $D_i$ may assist to determine the position of the RCQM device 102 relative to a signal plot point, which may correspond to a physical spot at the designated cleaning location. The calculated shortest Euclidean distance may be compared with a predefined Euclidean distance threshold value (hereinafter referred to as distance threshold value), which may define a proximity from the signal plot point. The server 104 may determine the RCQM device 102 being proximate to the signal plot point based on the corresponding calculated shortest Euclidean distance being less than the predefined distance threshold value. Accordingly, a signal plot point from the training dataset whose associated stored RSSI value provides the shortest Euclidean distance relative to the predefined distance threshold value, such signal plot point may be considered nearest to the RCQM device 102. The predefined distance threshold value may have a suitable Euclidean distance value (in dBm) corresponding to a metric distance value ranging from approximately 0.3 meters to approximately 2 meters. One of skill in the art may employ any suitable mathematical methods known in the art, related art, or developed later to represent the Euclidean distance value (in dBM) of the predefined distance threshold value into any suitable distance measuring unit, or vice versa, for being comparable with the calculated Euclidean distances. Accordingly, the server 104 may determine the position of the RCQM device 102 being proximate to the a signal plot point (hereinafter referred to as base signal plot point) based on a signal strength (e.g., a first RSSI value) from the set of first signal strengths in the training dataset that provides the shortest Euclidean distance with the second signal strength (e.g., a second RSSI value) of the received signal. Additionally, or alternatively, camera images corresponding to the signal plot points and/or orientation or direction sensor data of the RCQM device 102 may be used to further assist in determining the position of the RCQM device 102 relative to a signal plot point such at the designated cleaning location.

Other embodiments may include the server 104 being preconfigured or dynamically configured to determine at least two stored RSSI values and associated signal plot points, which may be nearest to the RCQM device 102 for estimating a relative position of the RCQM device 102. For example, the server 104 may determine a set of at least two nearest signal plot points between which the RCQM device 102 may be located based on the shortest Euclidean distances between the RSSI value of the received signal and those RSSI values stored in the training dataset as discussed above. The server 104 may determine these two stored RSSI values based on the corresponding Euclidean distances being the shortest with the received RSSI value (e.g., the second RSSI value) relative to other RSSI values stored in the training dataset. In some instances, the Euclidean distances of the second RSSI value with each of these two stored RSSI values may be different. Yet another embodiment may include the server 104 being preconfigured or dynamically configured to determine at least three signal plot points nearest to the RCQM device, such that the RCQM device 102 may be located in-between the at least two of those three signal plot points, which may be non-linearly arranged on the signal plot plan. The server 104 may determine a region defined by such non-linear signal plot points on the signal plot plan for the designated cleaning location. Further, the server 104 may fetch the selected plot point, and aspects thereof, from the storage unit 508 for being compared with the base signal plot point. If there is match based on the comparison, the server 104 may determine the base signal plot point as being the selected plot point and the position of the RCQM device 102 being proximate thereto. The server 104 may accordingly communicate the determined position of the RCQM device 102 as being proximate to the selected plot point to the RCQM module 516.

At step 806, a cumulative duration spent at the determined position may be calculated. The RCQM module 516 may be preconfigured or dynamically configured to determine an amount of time spent by the RCQM device 102 at the position determined as being proximate to a signal plot point such as the base signal plot point upon being determined as the selected signal plot point. In one embodiment, the RCQM module 516 may determine a cumulative duration spent at the position based on a predefined cleaning schedule associated with the designated cleaning location including the determined position. In some embodiments, the cleaning schedule may be associated with the physical spot corresponding to a signal plot point such as the selected signal plot point. For instance, the RCQM module 516, or the server 104, may define a cleaning schedule as a set of a cleaning task such as wiping dust and stains, and a maximum duration such as 300 seconds associated therewith for completing that cleaning task within a preset period such as 8 hours between clock times 9:00 am and 5:00 pm. The maximum duration may refer to a maximum amount of time available or set for completing an intended cleaning task or a set of cleaning tasks at the determined position proximate to a signal plot point such as the selected signal plot point. The value of maximum duration may be defined or adjusted based on (i) the cleaning task and/or (ii) the designated physical location or a portion thereof associated with the cleaning schedule. In some embodiments, the maximum duration may be less than or equal to the preset period. The preset period may refer to a predefined duration for which a cleaning entity may be required to be available at the designated physical location, or a portion thereof. In some embodiments, the preset period may correspond to an assigned work shift and defined as a duration between a preset entry clock time and a preset exit clock time for the cleaning entity at the designated physical location or a portion thereof such as the designated cleaning location. Other embodiments may include the preset period being defined as a duration between a preset entry clock time and a preset exit clock time for the cleaning entity at a geographical location indicating the designated physical location, or a portion thereof.

The RCQM module 516 may be configured to record the cumulative duration spent at the determined position anytime within the preset period, for example, of 8 hours, irrespective of the RCQM device 102 moving away from the selected signal plot point. As such, the cumulative duration may refer to a sum of temporally separate discrete durations spent at the determined position within the preset period. The RCQM module 516, in communication with the server 104, may determine the RCQM device 102 being moved from the determined position to a new location away from the selected signal plot point proximate to the determined position based on the shortest Euclidean distance calculated previously between the corresponding first signal strength (e.g., RSSI value) stored in the training dataset and the received second signal strength at that position. If this shortest Euclidean distance exceeds the predefined distance threshold value, the RCQM module 516 may determine the RCQM device 102 being moved outside the predefined proximity of the selected signal plot point.

The RCQM module 516 may record the duration for each time the position of the RCQM device 102 may be determined proximate to the selected signal plot point within the preset period of the cleaning schedule. Accordingly, the RCQM module 516 may add the recorded durations at different intervals or clock times within the preset period of the cleaning schedule to determine the cumulative duration spent at the determined position proximate to a signal plot point, such as the selected plot point, which may be chosen based on the one or more cleaning attributes, as discussed above. However, in some embodiments, the cumulative duration may refer to a single continuous duration spent at the determined position while the RCQM device 102 remains proximate to a signal plot point such as the selected signal plot point. In some instances, such continuous duration may assist to qualify physical inspections of the determined position or a physical spot corresponding to the proximate signal plot point such as the selected signal plot point. For example, the continuous duration spent at the determined position proximate to a signal plot point relative to a preset time threshold value may indicate a predefined cleaning quality or a quality of inspection performed by an inspection staff. The calculate cumulative duration may be communicated to the server 104, or stored in the database 510 or the storage unit 508 by the RCQM module 516.

Figure 9:
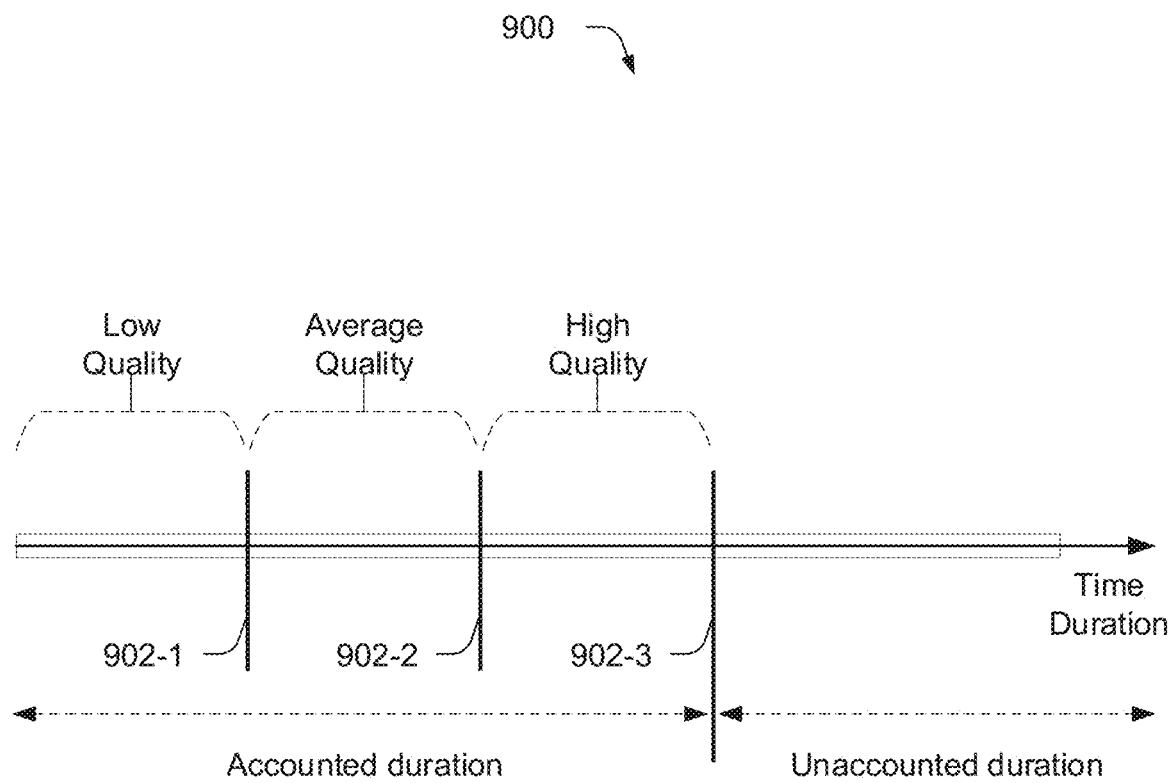
FIG. 9 illustrates an exemplary cleaning quality metric implemented by the RCQM device of FIG. 5, according to an embodiment of the present disclosure.

In one embodiment, the server 104 may be preconfigured or dynamically configured to assess a cleaning quality for the determined position based on the calculated cumulative duration relative to a set of one or more predefined time threshold values. For example, as illustrated in FIG. 9, the server 104 may predefine or dynamically define a metric 900 involving a set of predefined time threshold values such as a first time threshold value 902-1, a second time threshold value 902-2, and a third time threshold value 902-3, collectively referred to as predefined time threshold values 902. The cumulative duration up to a maximum time threshold value such as the third time threshold value 902-3 may refer to an accounted duration, which may be used by the server 104 to assess the cleaning quality. The accounted duration may indicate an acceptable time period for performing a cleaning-related actions (e.g., cleaning tasks, inspections, etc.) that may be set based on a user input or time-bound cleaning obligations. However, a portion of the cumulative duration exceeding the maximum time threshold value may refer to an unaccounted duration, which may not be used by the server 104 to assess the cleaning quality. The unaccounted duration may indicate a time period exceeding the time-bound cleaning obligations or a user input. For example, the unaccounted duration may indicate inefficiencies in performing a cleaning task or a break time. Another example may include the unaccounted duration being indicative of non-chargeable or unpaid hours in a scenario of delivering cleaning services.

In one instance, the RCQM module 516 may assess the cleaning quality for the determined position as (1) "Low quality" if the cumulative duration spent by the RCQM device 102 may be less than or equal to the first time threshold value 902-1; (2) "Average quality" if the cumulative duration spent is below or equal to the second time threshold value 902-2 and above the first time threshold value 902-1; or (3) "High quality" if the cumulative duration is less than or equal to the third time threshold value 902-3 and above the second time threshold value 902-2. In other instances where the cumulative duration may be above the third time threshold value 902-3, the server 104 may consider a portion of the cumulative duration exceeding the third time threshold value 902-3 as the unaccounted duration, which may be indicative of a recess/break time or inefficient cleaning performance. The server 104 may provide an indication (e.g., audio, visual, haptic, text-based, symbolic, or any combinations thereof) based on the calculated cumulative duration exceeding the maximum time threshold value such as the third time threshold value 902-3. In some embodiments, the cleaning quality may be further assessed based on (1) a number of passes made by the RCQM device 102 proximate to a signal plot point preselected based on the one or more cleaning attributes associated with the designated cleaning location, (2) relative proximity of the RCQM device 102 to the physical spots corresponding to the one or more selected signal plot points, or (3) such relative proximity while the RCQM device 102 passes along a different physical spot corresponding to another signal plot point.

In one embodiment, the predefined time threshold values 902 may be relative to a total time spent proximate to at least one of (i) a physical spot corresponding to a signal plot point, (ii) the designated physical location or a portion thereof, and (iii) a geographical location indicating the designated physical location, or a portion thereof, and any combinations thereof. For example, the first time threshold value 902-1 may be 30 seconds, the second time threshold value 902-2 may be 60 seconds, and the third time threshold value 902-3 may be 120 seconds spent proximate to the physical spot corresponding to the signal plot point such as the selected signal plot point. In some embodiments, at least one of the predefined time threshold values 902 may be equivalent to at least one maximum duration noted in the predefined cleaning schedule. For example, the maximum time threshold value (e.g., the third time threshold value 902-3) may be equivalent to at least one maximum duration noted in the predefined cleaning schedule. The first time threshold value 902-1 and the second time threshold value 902-2 may be defined or adjusted based on a variety of factors including, but not limited to, (1) the experience, skill, trainings, or past cleaning performances of a cleaning entity; (2) a starting cleaning condition or cleanliness of the designated physical location or that of the designated cleaning location; (3) intended use or purpose of the designated cleaning location or associated designated physical location; (4) defined time-bound cleaning obligations, e.g., in a cleaning service contract; (5) a request or feedback from a user; (6) physical characteristics of the designated cleaning location such as those mentioned above including size, number of objects, and room type such as a conference room or a bathroom; (7) a clock time of the next intended use of the designated cleaning location or the next cleaning or inspection tasks; (8) a type of cleaning task (e.g., simple dust removal versus removal of hard stains); (9) number of inspections or outcomes thereof; (10) use of different cleaning technologies or equipment; or any combinations thereof.

In another embodiment, the server 104 may include a predefined time threshold value with respect to a specific unit of area. For instance, the RCQM module 516 may predefine or dynamically define a time threshold value per square meter to assess the cleaning quality. Based on a position of the RCQM device 102 between the nearest at least two signal plot points, the RCQM device 102 may determine the cleaning quality as (1) "Low quality" if a cumulative duration spent by the RCQM device 102 within at least one square meter of a region between the nearest at least two signal plot points may be less than or equal to a first predefined time threshold value per square meter (e.g., 60 seconds); (2) "Average quality" if that cumulative duration spent within the at least one square meter of the region is greater than the first predefined time threshold value per square meter but less than or equal to a second predefined time threshold value per square meter (e.g., 120 seconds); or (3) "High quality" if that cumulative duration spent within the at least one square meter of the region is greater than the second predefined time threshold value per square meter but less than or equal to a third predefined time threshold value per square meter (e.g., 240 seconds).

In yet another embodiment, the server 104 may also calculate a total time spent by the RCQM device 102 at a geographical location indicating the designated physical location. Such total time may be calculated based on an entry clock time and an exit clock time of the RCQM device 102 at the geographical location associated therewith. Accordingly, the server 104 may assess the cleaning quality based on the total time spent by the RCQM device 102 at various designated cleaning locations or physical spots indicated by the signal plot points within the geographical location. For instance, the server 104 may assess the cleaning quality as (1) "Unacceptable" if the cumulative duration spent by the RCQM device 102 proximate to a signal plot point selected based on a cleaning attribute may be less than or equal to 20% of the total time spent at the geographical location indicating the designated physical location; (2) as "Need improvement" if that cumulative duration spent may be greater than 20% but less than or equal to 60% of the total time spent at the geographical location; and (3) as "Acceptable" if that cumulative duration spent may be greater than 60% of the total time spent at the geographical location.

In further embodiments, the server 104 may accordingly highlight a set of signal plot points on the signal plot plan based on the cleaning quality assessed relative to the set of predefined time threshold values 902. These highlighted set of signal plot points may be different from those that were selected earlier by the server 104 based on the cleaning attribute. The highlighted signal plot points may be proximate to the RCQM device 102 or through which the RCQM device 102 may have passed at the designated cleaning location or the designated physical location.

In yet another embodiment, the server 104 may be preconfigured or dynamically configured to compute various aspects related to the cleaning entity based on the calculated durations including the cumulative duration and the assessed cleaning quality. For example, the server 104 may compute a cleaning performance of the cleaning entity as shown in equation 2:

$$\text{Cleaning Performance} = \frac{\text{Cumulative Duration}_{Accounted}}{\text{Total Cumulative Duration}_{Accounted+Unaccounted}} \quad (2)$$

where:
Cumulative Duration$_{Accounted}$=a portion of a cumulative duration spent at a physical location up to a predefined maximum time threshold value
Total Cumulative Duration$_{Accounted+Unaccounted}$=the total cumulative duration spent at the physical location irrespective of the predefined maximum time threshold value As shown in equation 2, the cleaning performance may be calculated as a ratio of the cumulative duration spent at a physical location, such as the determined position, up to a predefined maximum time threshold value and a total cumulative duration spent at that physical location irrespective of the predefined maximum time threshold value. In one example, the predefined maximum time threshold value may be a maximum duration available or set for performing an intended cleaning task or a set of cleaning tasks at the determined position proximate to a signal plot point such as the selected plot point. Both the cumulative duration and the total cumulative duration may be represented in seconds; however, other suitable measurement or referential units may be contemplated. Further, the server 104 may be configured to compute a time efficiency of the cleaning entity based on the calculated cumulative duration, the calculated unaccounted duration, and the preset period based on equation 3:

$$\text{Time Efficiency} = \frac{\text{Cumulative Duration}_{Accounted}}{\text{Preset Period}} \times 100 \quad (3)$$

where:
Cumulative Duration$_{Accounted}$=a portion of a cumulative duration spent at a physical location up to a predefined maximum time threshold value
Preset Period=a predefined duration for which a cleaning entity is required to be available at the physical location as per the predefined cleaning schedule In equation 3, the cumulative duration and the preset period may be represented in seconds, and the time efficiency may be represented in percentage; however, other suitable units or referential values may be contemplated. The calculated time efficiency and/or the cleaning performance may be stored in a storage device such as the storage unit 508. Embodiments may further include the server 104 being preconfigured or dynamically configured to (i) compute a performance rating of a cleaning entity, (ii) compute or improve cleaning-related billing, and/or (iii) conduct remote cleaning inspections for the determined position proximate to the selected plot point based on the calculated time efficiency and/or the cleaning performance of the cleaning entity.

In one embodiment, the server 104 may be preconfigured or dynamically configured to determine a performance rating of a cleaning entity based on the calculated cleaning performance and/or the time efficiency. For example, the server 104 may assign a rating as (i) "Excellent" if the calculated time efficiency may be greater than or equal to 90%, or the calculated cleaning performance may be greater than or equal to 0.9; (ii) "Good" if the calculated time efficiency may be greater than or equal to 80% but less than 90%, or the calculated cleaning performance may be greater than or equal to 0.8 but less than 0.9; (iii) "Average" if the calculated time efficiency may be greater than or equal to 70% but less than 80%, or the calculated cleaning performance may be greater than or equal to 0.7 but less than 0.8; and (iv) "Poor" if the calculated time efficiency may be less than 70%, or the calculated cleaning performance may be less than 0.7. Further, the server 104 may associate any of various types of functional data for rating based on a type of the cleaning entity. For instance, for the cleaning entity being a human cleaning staff operatively associated with the RCQM device 102, examples of such functional data may include, but not limited to, employment data (e.g., agent name, agent employee ID, designation, tenure, experience, previous organization, supervisor name, supervisor employee ID, etc.), demographic data (for example, gender, race, age, education, accent, income, nationality, ethnicity, area code, zip code, marital status, job status, etc.), psychographic data (for example, introversion, sociability, aspirations, hobbies, etc.), system access data (for example, login ID, password, biometric data, etc.), and health data (e.g., existing and past medical conditions such as diabetes, hypertension, and heart stroke, existing and past medications, family history of medical conditions, weight, etc. as well as lifestyle data such as exercise schedule, exercise amount, food habits, daily activity duration, and so on). In another instance, for the cleaning staff being a cleaning equipment operatively associated with RCQM device 102, examples of the functional data may include, but not limited to, area coverage, navigational and autonomous capabilities, manufacturer, equipment type, make and model, associated movable and non-movable components, equipment dimensions (e.g., length, breadth, depth, height, area, etc.), equipment weight, communication abilities, and so on.

In another embodiment, the server 104 may be configured to apply different billing rates based on the calculated cleaning performance and/or the time efficiency independently or in combination with other parameters. For example, the server 104 may apply a relatively higher billing rate if the calculated time efficiency may be greater than or equal to 90%, the calculated cleaning performance may be greater than or equal to 0.9, the performance rating of the cleaning entity may be greater than or equal to 90%, or the assessed cleaning quality may be "High quality," or any combinations thereof.

In still another embodiment, the server 104 may be configured to conduct remote cleaning inspections based on the calculated cleaning performance and/or the time efficiency in independently or in combination with other calculated parameters. For example, the server 104 may perform a remote inspection for the determined position and define the assessed cleaning quality as (1) "Final—Work Complete" if the cleaning quality may be assessed as "High quality" and at least one of (i) the calculated time efficiency may be greater than or equal to 70%, the calculated cleaning performance may be greater than or equal to 0.7 and (2) "Needs Rework" if the cleaning quality may be assessed as "Low quality" or "Average quality" and at least one of (i) the calculated time efficiency may be less than 70% and (ii) the calculated cleaning performance may be less than 0.7.

Other embodiments may include the server 104 being preconfigured or dynamically configured to (i) assess a cleaning task being performed and (ii) manage attendance of the cleaning entity at the designated physical location, or a portion thereof. For example, the server 104 may assess a cleaning task being performed based on one or more inputs received from a suitable sensor located on the RCQM device 102, or an operatively associated user device 108 (e.g., cleaning equipment). For instance, the RCQM device 102 may include a vibration sensor providing vibration data based on the RCQM device 102 being moved. The server 104 may receive the vibration data to determine a cleaning task being performed. In another example, the server 104 may manage an attendance of the cleaning entity at the designated physical location, or a portion thereof, based on the preset period in the predefined cleaning schedule. For example, the server 104 may be configured to automatically record a start clock time and an end clock time based on the cleaning entity entering and leaving the geofence area respectively. The recorded start and end clock times may be compared with preset clock times defining the preset period in the predefined cleaning schedule to maintain a record of availability of the cleaning entity at the designated physical location, or a portion thereof. In some embodiments, the preset period may be defined by preset clock times for entering and exiting the indoor virtual fence.

The RCQM module 516 may communicate the signal plot plan, the assessed cleaning quality, each of the associated cumulative durations or other durations/periods and clock times, the calculated cleaning performance, and the calculated time efficiency to the output module 518 or store them in the database 510 or the storage unit 508.

Output Module

The output module 518 may be in communication with various modules including the input module 512, the plot training module 514, and the RCQM module 516, and the network devices such as the server 104 and the network appliance 302. The output module 518 may receive or access various data including the signal plot plan, the assessed cleaning quality, the calculated cumulative durations or other durations/periods, the calculated cleaning performance, and the calculated time efficiency from the RCQM module 516, the database 510, or the storage unit 508. Examples of the output module 518 may include, but are not limited to, a display device such as a touchscreen display, a handling device such as a print head controller; a storage device such as the memory 506; any computing device such as a laptop, a mobile phone, a printer, and a server 104; or any combination thereof.

In one embodiment, the output module 518 may be configured to store, process, communicate, display, or print the data. For example, the output module 518 may send the signal plot plan, the assessed cleaning quality, and the calculated cumulative duration spent to a multifunctional device including one or more printing or marking engines (not shown) configured to print the signal plot plan or a report including the associated cumulative duration with, or without, the cleaning quality assessed using the server 104 in communication with the input module 512. In some embodiments, the output module 518 may provide an indication (e.g., audio, visual, haptic, text-based, symbolic, or any combinations thereof) to a user or a computing device such as the user device 108 (e.g., a mobile phone, a desktop, etc.) accessible by a user such as a cleaning staff, a customer, and a supervisor. In some other embodiments, the output module 518 may be provide an indication based on the calculated cumulative duration exceeding a predefined time threshold value (e.g., the first time threshold value 902-1, the second time threshold value 902-2, the maximum time threshold value such as the third time threshold value 902-3, etc.) in a set of one or more predefined time threshold values such as the predefined time threshold values 902. Other embodiments may include the output module 518 providing an indication based on the assessed cleaning quality to assist in remotely managing the cleaning quality as well as the calculated time efficiency and/or the cleaning performance of the cleaning entity, or any combinations thereof.

FIGS. 10-13 illustrate an exemplary application scenario for implementing the RCQM device of FIG. 5, according to embodiments of the present disclosure. The application scenario is discussed herein with reference to the RCQM device 102; however, one having ordinary skill in the art would understand such scenario including others may be implemented with embodiments discussed above using RCQM devices 110 in a distributed or decentralized network architecture. In one embodiment, the RCQM device 102 may be implemented in two modes, namely, a training mode and an operation mode, to remotely manage the cleaning quality of a designated cleaning location based on the cumulative duration spent at a designated cleaning location based on a predefined cleaning schedule.

Training Mode

Figure 10:
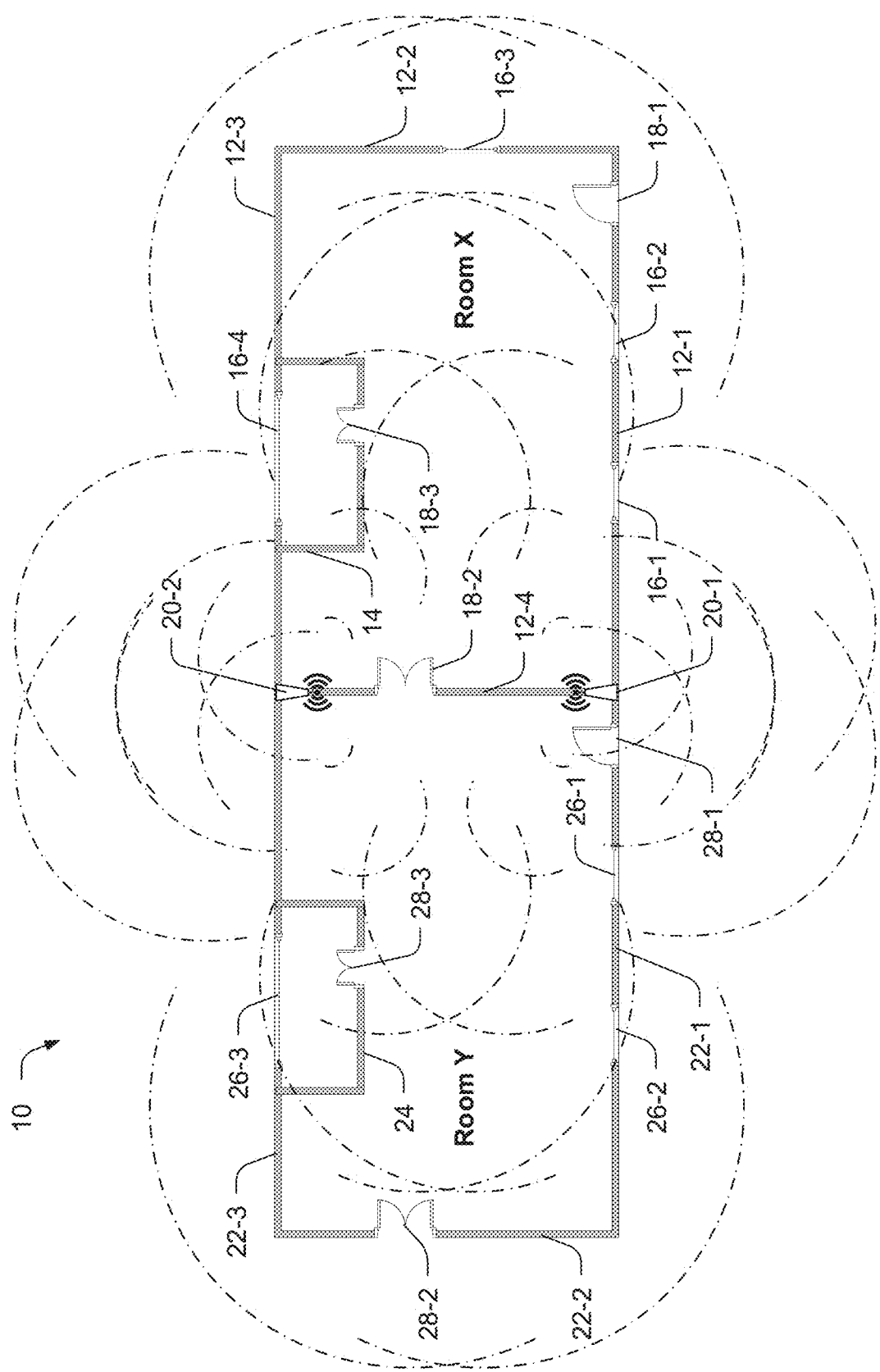
FIG. 10 illustrates an exemplary floor plan indicative of a designated physical location for implementing the RCQM device of FIG. 5, according to an embodiment of the present disclosure.

In one embodiment, the training mode may be performed in two temporally distinct steps; however, one having ordinary skill in the art would understand that these steps may be combined for being performed simultaneously. In a first step, the RCQM device 102 may receive the floor plan and assign preliminary plot points therein to generate the plot plan via the input module 512. The RCQM device 102 may receive the floor plan along with the set of predefined physical and non-physical characteristics associated therewith and the one or more cleaning attributes. The floor plan may be received or accessed from the database 510, the storage device such as the storage unit 508, or any other network device. For example, as illustrated in FIG. 10, the RCQM device 102 may access a floor plan 10 indicative of a designated physical location such as a storey of a building having a couple of rooms. The floor plan 10 may be associated with non-physical characteristics of the designated physical location such as room numbers, namely, "Room-X" and "Room-Y." The floor plan 10 may also be associated with the physical characteristics of the designated physical location. For example, the floor plan 10 may be associated with image objects indicative of a boundary 12-1, 12-2, 12-3, and 12-4 (collectively, boundary 12), a partition 14, windows 16-1, 16-2, 16-3, and 16-4 (collectively, referred to as windows 16), entry/exit points 18-1, 18-2, and 18-3 (collectively, entry/exit points 18), and tangible objects such as fixed wireless access points 20-1 and 20-2 (collectively, WAPs 20) associated with Room-X. Similarly, the floor plan 10 may be further associated with image objects indicative of a boundary 22-1, 22-2, 22-3, and 12-4, a partition 24, windows 26-1, 26-2, 26-3 (collectively, referred to as windows 26), and entry/exit points 28-1, 28-2, 28-3, 18-2, as well as the tangible objects such as WAPs 20 proximate to Room-Y. The dashed curves may represent signals provided by the WAPs 20.

On the accessed floor plan 10, the RCQM device 102 may select a region indicative of a portion of the designated physical location to be cleaned. For example, the portion may indicate a designated cleaning location, which may be selected based on the one or more non-physical characteristics of the designation physical location and/or the one or more predefined cleaning attributes. For example, the input module 512 of the RCQM device 102 may select one of the rooms on the floor plan 10 based on the room name, "Room-X," which may be required to be cleaned based on the one or more cleaning attributes such as the predefined cleaning schedule. In some embodiments, the region such as the Room-X may be selected by the RCQM device 102 based on a user input.

Figure 11:
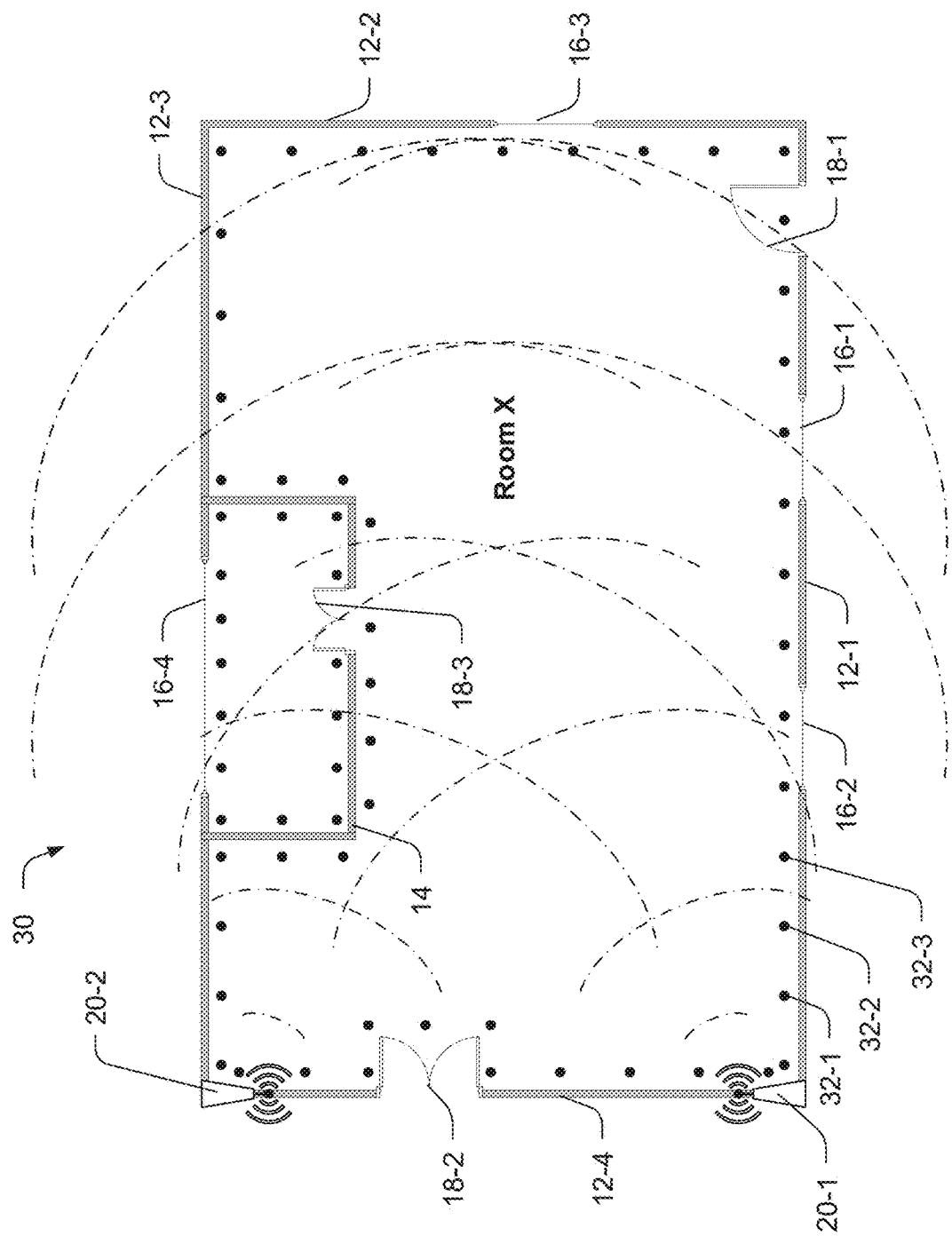
FIG. 11 illustrates a portion of the floor plan of FIG. 10 including exemplary preliminary plot points implemented using the RCQM device of FIG. 5, according to an embodiment of the present disclosure.

In the selected region such as Room-X, the RCQM device 102 may assign a set of preliminary plot points on the floor plan 10 to generate a plot plan 30. The input module 512 of the RCQM device 102 may assign the set of preliminary plot points based on the one or more associated physical characteristics of the corresponding designated cleaning location. In one example, as illustrated in FIG. 11, the RCQM device 102 may assign a set of preliminary plot points 32-1, 32-2, . . . , 32-$n$ (collectively referred to as preliminary plot points 32) based on the boundary 12 and the partition 14 of the designated physical location indicated within the selected region of the floor plan 10. The input module 512 of the RCQM device 102 may identify the boundary 12 and the partition 14 using any of a variety of computer vision and/or machine learning methods known in the art, related art, or developed later such as those mentioned above. Once identified, in one embodiment, the RCQM device 102 may assign the preliminary plot points 32, shown as black circles, along the boundary 12 and the partition 14 with each of the preliminary plot points 32 at a shortest relative distance (e.g., at least approximately 0.2 meters) from the boundary 12 and the partition 14 within Room-X. In the illustrated example of FIG. 11, the assigned preliminary plot points 32 may substantially enclose the selected region, e.g., Room-X, of the floor plan 10. Further, the RCQM device 102 may assign the preliminary plot points 32 at a predefined distance (e.g., at least approximately 0.3 meters) from each other to generate the plot plan 30.

In a second step of the training mode, the RCQM device 102 (indicated by a star in FIG. 12), or any other device in communication with the RCQM device 102 such as the user device 108, may be physically navigated, by a user or autonomously, through a portion of the designated physical location such as the designated cleaning location indicated by the plot plan 30. In some embodiments, the RCQM device 102 or the user device 108 may be navigated autonomously using the processor(s) 502 or any other control unit (not shown) in communication with the processor(s) 502. The RCQM device 102 may assign one or more signal plot points on the plot plan 30 based on a predefined signal received by the RCQM device 102 at the designated cleaning location such as Room-X. For example, as illustrated in FIG. 11, the plot training module 514 of the RCQM device 102 may scan for Wi-Fi signals received from at least one fixed network device such as the fixed WAPs 20 when the RCQM device 102 may be proximate to a portion of the designated physical location such as Room-X. In some embodiments, the RCQM device 102 may include a proximity sensor, which may trigger the plot training module 514 to initiate the signal scanning based on the RCQM device 102 being proximate to Room-X. The Wi-Fi signals may comprise of one or more signal samples, each being in the form of packets. Each signal sample may be associated with a basic service set identifier (BSSID) value indicative of the media access control (MAC) address of the WAPs 20, which may have generated that signal sample.

Figure 12:
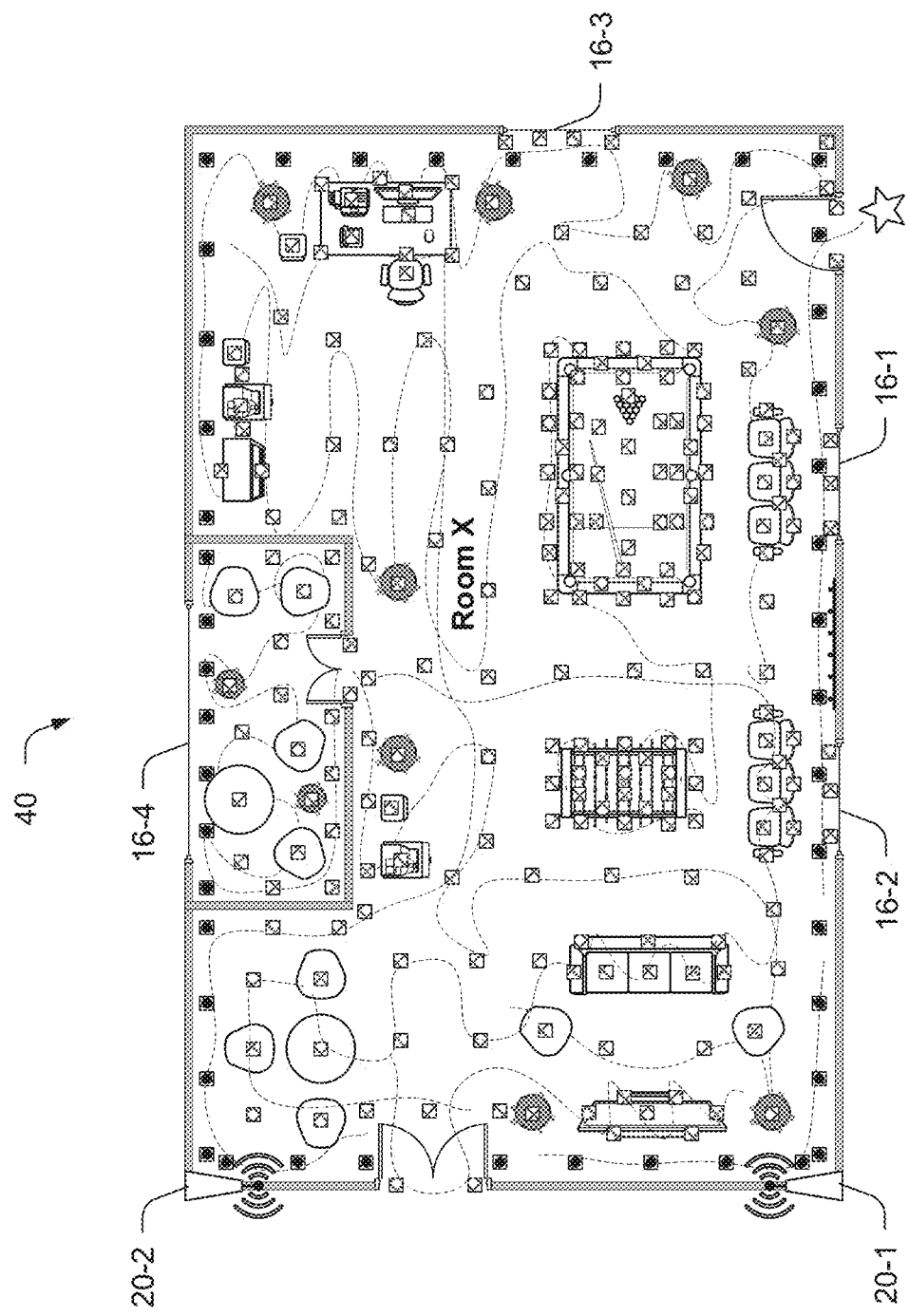
FIG. 12 illustrates an overlay of a top view of a designated cleaning location on the floor plan of FIG. 11 including exemplary signal plot points implemented using the RCQM device of FIG. 5, according to an embodiment of the present disclosure.

Further, the RCQM device 102 may determine the scanned Wi-Fi signal as being a stable signal if a predefined number of signal samples or pulses (e.g., at least two signal samples) are received for a predetermined amount of time (e.g., one millisecond) from at least one of the fixed WAPs 20, provided signal strengths (e.g., RSSI values) of the Wi-Fi signal samples are above a predefined signal threshold value (e.g., −70 dBm). Based on the stable Wi-Fi signals being received, the RCQM device 102 may identify the WAPs 20 as available. The RCQM device 102 may then be navigated through various physical spots at the designated cleaning location such as Room-X to assign the one or more signal plot points on the plot plan 30 based on the received stable Wi-Fi signals for generating a signal plot plan 40. Each signal plot point may be indicative of a physical spot in the designated physical location where the stable signal may be received. In one embodiment, the RCQM module 516 may assign a signal plot point relative to a preliminary plot point. For example, as illustrated in FIG. 12, the plot training module 514 in communication with the RCQM device 102 may assign the one or more signal plot points, shown as patterned squares, on the plot plan 30 to generate the signal plot plan 40. The patterned squares may represent the physical spots at the designated cleaning location (e.g., Room-X) such that (i) the physical spots may be within a predefined distance (e.g., at least approximately one foot or approximately 0.3 meters) from their nearest preliminary plot points, and (ii) the stable Wi-Fi signal may be received at those physical spots. Additionally, as shown in FIG. 12, the plot training module 514 may assign additional signal plot points within a predefined distance (e.g., at least approximately 0.5 meters) from each other and from those signal plot points that may be previously assigned proximate to the preliminary plot points. The signal plot points assigned proximate to the preliminary plot points, e.g., along the boundary 12 of the designated cleaning location, such as Room-X, may be used as an indoor virtual fence for determining clock times when the RCQM device 102, or an operatively associated cleaning entity, entered or exited Room-X. The narrow-dashed curves in FIG. 12 represent an exemplary physical path indicating the movement of the RCQM device 102, or a cleaning entity associated therewith, in the designated cleaning location for assigning the signal plot points. One of skill in the art would understand that the RCQM device 102, or the cleaning entity associated therewith, may be configured to follow any suitable path for assigning the signal plot points proximate to the preliminary plot points or otherwise as required.

Further, the preliminary plot points (not shown) may be assigned to obscured surfaces at the designated cleaning location based on a user input. For example, the RCQM device 102 may assign the preliminary plot points on the floor plan 10 corresponding to locations at or around the tangible room objects, e.g., couch, television, game tables, etc. including the obscured surfaces proximate thereto. Examples of such obscured surfaces may include, but are not limited to, a rear surface of the television, a floor surface underneath a couch, an underside surface of the game table, a constricted area behind a door, etc.

For each of the assigned signal plot points, the RCQM device 102 may record a plot point identifier (e.g., a reference number, an indoor location coordinates, etc.) of the signal plot point, a signal identifier such as the strength (e.g., RSSI value) of the stable Wi-Fi signal received at a physical spot indicated by the signal plot point, a network device identifier (e.g., BSSID value) of the WAPs 20 providing the stable Wi-Fi signal for creating the training dataset. In some embodiments, the training dataset may also include geographical location coordinates associated with the designated physical location for each of the assigned signal plot points. The RCQM device 102 may accordingly create signal fingerprints of the stable Wi-Fi signal at the physical spots in the designated cleaning location by way of mapping the signal plot points on the plot plan 30.

Operation Mode

During operation, a cleaning entity such as a user operatively associated with the RCQM device 102 may arrive to a geographical location such as an airport for an assigned work shift. The RCQM device 102, in communication with the server 104, may identify the predefined geofence based on the GPS coordinates surrounding the geographical location stored in the database 510 or a storage unit such as the storage unit 508. The server 104 may determine the availability of the user for the assigned work shift as per the predefined cleaning schedule at the geographical location based on the user entering the geofence area. Upon determining the availability, the RCQM device 102 may record the clock time of arrival of the user and may scan for a nearest plot point at a designated physical location within the geographical location.

Figure 13:
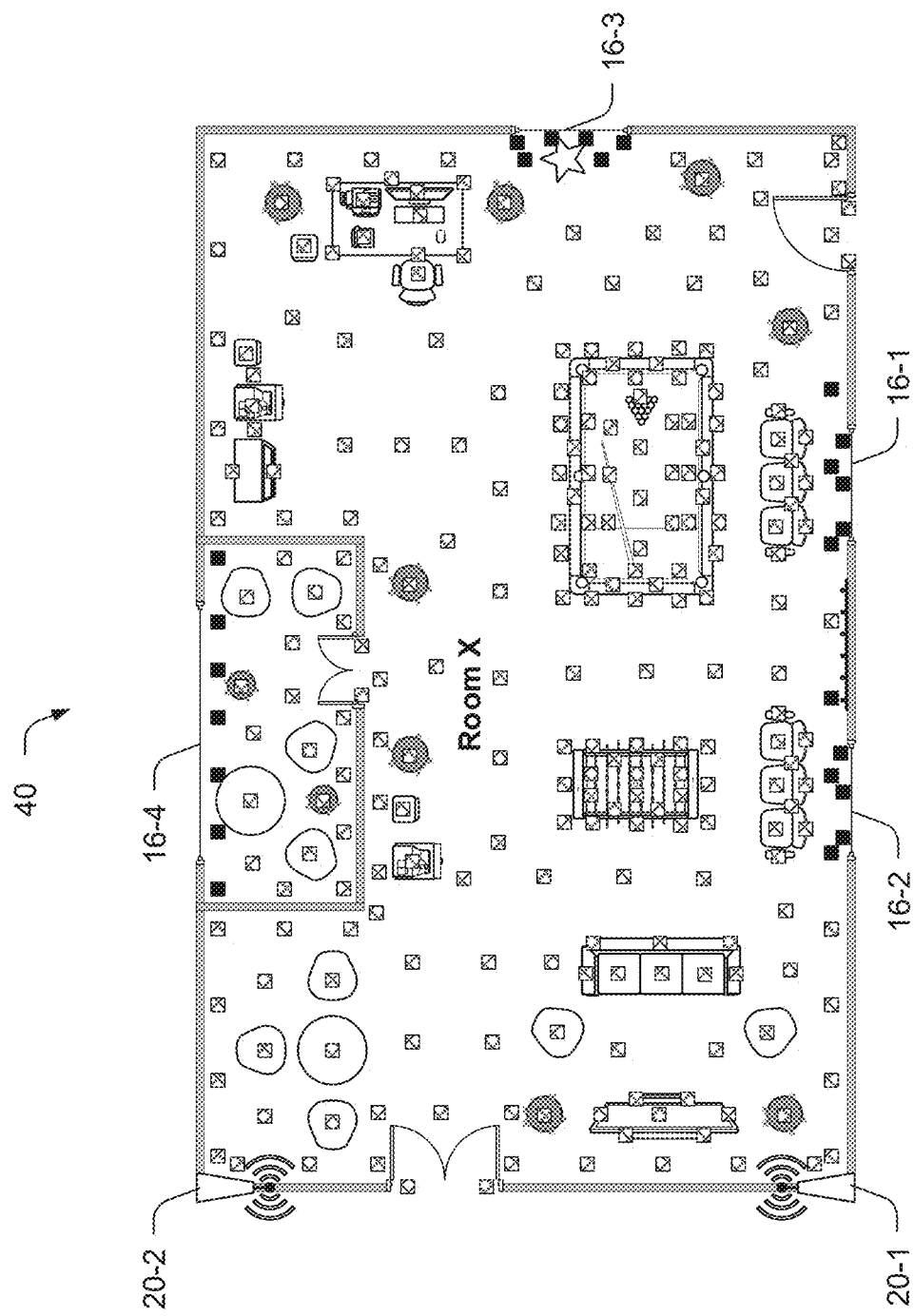
FIG. 13 illustrates the overlay of FIG. 12 indicating a set of signal plot points selected for the RCQM device of FIG. 5, according to an embodiment of the present disclosure.

Further, the RCQM device 102 may access data associated with the designated physical location from the server 104 to assess the cleaning quality for a physical spot at the designated physical location or a portion thereof among other aspects. In some embodiments, such data as well as the GPS coordinates defining the geofence area may be stored locally in the database such as the database 510 of the RCQM device 102. The accessed data may include the training dataset, the signal plot plan 40, and the cleaning attributes associated therewith corresponding to a portion of the designated physical location such as the designated cleaning location to be cleaned. In one embodiment, in communication with the RCQM device 102, the server 104 may select at least one signal plot point based on the one or more cleaning attributes associated with a portion of the designated physical location such as the designated cleaning location. For example, as shown in FIG. 13, the RCQM device 102 may select the signal plot points, shown by black squares, proximate to the windows 16 based on the predefined cleaning schedule. In one instance, the RCQM device 102, or the server 104, may select the signal plot points corresponding to physical spots within a predefined distance (e.g., at least approximately 1 meter) from the windows 16. In some embodiments, the signal plot points may be selected by the server 104 based on a user input.

When the RCQM device 102 may be proximate to the designated cleaning location such as Room-X, the RCQM module 516 in communication with the RCQM device 102 may scan for a predefined signal such as Wi-Fi signals received from at least one fixed network device, where both the received predefined signal and the fixed network device may be used to create the training dataset for the designated cleaning location. If the received Wi-Fi signals are stable signals, the RCQM device 102 may determine an attribute thereof such as the signal strength (e.g., represented by RSSI value) for determining a position of the RCQM device 102 relative to the signal plot points such as the selected plot points. For example, the RCQM module 516 in communication with the RCQM device 102 may compare the RSSI value of the received Wi-Fi signals with the RSSI values stored in the training dataset. Based on the comparison, the RCQM module 516 may determine the position of the RCQM device 102 relative to the signal plot point whose corresponding stored RSSI value provides the shortest Euclidean distance with the RSSI value of the received Wi-Fi signal. Accordingly, the RCQM device 102 (indicated by a star in FIG. 13) may (i) record the entry and exit clock times based on the RCQM device 102 being proximate to the signal plot points along the entry/exit points 18 (e.g. doors) and the partition 14; (ii) a position of the RCQM device 102 proximate to the selected signal plot points proximate to the windows 16; (iii) determine a cumulative duration spent proximate to the selected signal plot points based on the predefined cleaning schedule; and (iv) determine the RCQM device 102 moving outside the proximity of the selected signal plot points based on the corresponding Euclidean distance exceeding a predefined distance threshold value.

Based on the determined cumulative duration, the server 104 may assess the cleaning quality for the determined position. For example, the server 104 may assess the cleaning quality as (1) "Low quality" if the cumulative duration spent by the RCQM device 102 may be less than or equal to a first time threshold value (e.g., 30 seconds); (2) "Average quality" if the cumulative duration spent is less than or equal to a second time threshold value (e.g., 60 seconds) and greater than the first time threshold value; or (3) "High quality" if the cumulative duration is less than or equal to a third time threshold value (e.g. 120 seconds), and greater than the second time threshold value. In one embodiment, the third time threshold value may be the maximum duration in the predefined cleaning schedule. The maximum duration may refer to the maximum amount of time available or set for completing an intended cleaning task or a set of cleaning tasks at the determined position proximate to a signal plot point such as the selected plot point. The value of maximum duration may be defined or adjusted based on (i) the cleaning task and/or (ii) the designated physical location or a portion thereof associated with the predefined cleaning schedule. In some embodiments, the maximum duration may be less than or equal to the preset period.

Further, the server 104 may consider a portion of the cumulative duration as the unaccounted duration if the portion exceeds the maximum time threshold value such as the third time threshold value 902-3. The unaccounted duration may not be considered by the server 104 for assessing the cleaning quality. In some instances, the unaccounted duration may be indicative of a recess or a break time. In some embodiments, the cleaning quality may be further assessed based on (1) a number of passes made by the RCQM device 102 proximate to the selected signal plot points, (2) a relative proximity of the RCQM device 102 to the physical spots corresponding to the one or more selected signal plot points, and/or (3) such relative proximity while the RCQM device 102 passes along a different physical spot corresponding to another signal plot point. In another embodiment, the RCQM device 102 may include a predefined time threshold value with respect to a specific unit of area. For instance, the RCQM device 102 may predefine or dynamically define a time threshold value per square meter to determine a cleaning quality as discussed above. In yet another embodiment, the RCQM device 102 may assess the cleaning quality based on the total time spent by the RCQM module 516 at various designated cleaning locations or physical spots indicated by the signal plot points on signal plot plan 40, as discussed above.

In some embodiments, the RCQM device 102 may combine (1) surrounding images or (2) orientation or direction sensor data of the RCQM device 102, or that of an associated device such as the user device 108, or both, with the determined cumulative duration to determine the cleaning quality. The computed data including the determined cumulative duration or other time periods (e.g., entry/exit clock times, a total time spent at a geographical location corresponding to the designated physical location, etc.), the assessed cleaning quality, the cleaning performance, the time efficiency, and the signal plot plan 40 including the signal plot points traversed by the RCQM device 102 may be communicated to a user via the interface(s) 504 or stored in the database such as the database 510 or a storage device such as the storage unit 508. Such data may be used for viewing, reporting, billing, performance management, inspections, cleaning quality management, or any other suitable cleaning-related tasks for remotely managing the cleaning quality for a designated physical location, or any portion thereof such as the designated cleaning location, in real-time. Additionally, the RCQM device 102 and/or the server 104 may send various indications to the user, for example, at the end of the assigned work shift as per the predefined cleaning schedule. Upon such indication or otherwise, the RCQM device 102 and/or the server 104 may send an alert to the user and/or a supervisor when the user leaves the geofence area indicative of exiting the geographical location.

Although the above functions are performed by RCQM device 102, one having ordinary skill in the art would understand that aspects of the RCQM device 102 including the functions of the input module 512, the plot training module 514, or the RCQM module 516 may be executed by a networked device such as the server 104, and vice versa, to assess or manage the cleaning quality. Further, while aspects of the RCQM device 102 are described in the context of a centralized model by way of a server such as the server 104 operating in tandem with the RCQM device 102, one having skilled in the art would understand that such aspects may be implemented through a decentralized, distributed network architecture based on a blockchain methodology.

While the foregoing written description of the present disclosure enables one of ordinary skill to make and use what is considered presently to be the best mode thereof, those of ordinary skill will understand and appreciate the existence of variations, combinations, and equivalents of the specific embodiment, method, and examples herein. The present disclosure should therefore not be limited by the above described embodiment, method, and examples, but by all embodiments and methods within the scope and spirit of the present disclosure. Notably, the figures and examples are not meant to limit the scope of the present disclosure to a single embodiment, but other embodiments are possible by way of interchanging some or all of the described or illustrated elements.

The invention claimed is:

1. A computer-implemented method for remotely managing a local activity, the method comprising:
   receiving, using a base device, an input from a portable device navigable in an indoor location during a local activity, wherein the input includes a signal strength of a predefined signal; and
   providing, using the base device, an indication to a remote device based on a local position of the portable device determined proximate to a physical spot in the indoor location, the indication triggering the remote device to display a time duration spent by the portable device in the indoor location, wherein the time duration is displayed by the remote device based on the input and upon being triggered by the indication, wherein the time duration is recorded at one or more clock times for remotely managing the local activity.

2. The computer-implemented method of claim 1, wherein the local position is determined proximate to the physical spot based on a comparison between the signal strength and a set of one or more predetermined signal strengths of the predefined signal, wherein the set is associated with at least one of the physical spot and the indoor location.

3. The computer-implemented method of claim 1, wherein the time duration is recorded by at least one of the portable device and the base device, and wherein the input is received by the remote device from the portable device or a remote database in communication with the base device or the portable device.

4. The computer-implemented method of claim 1, wherein the time duration is recorded within a preset period.

5. The computer-implemented method of claim 1, wherein the remote device includes the portable device.

6. The computer-implemented method of claim 1, further comprising:
   calculating, using the base device, a plot position of the physical spot relative to the local position of the portable device, the relative plot position being calculated based on the input and a predetermined dataset including a plurality of plot points and one or more signal strengths associated therewith of the predefined signal, wherein the plurality of plot points corresponds to physical spots in the indoor location.

7. The computer-implemented method of claim 1, wherein the physical spot is selected based on a predefined attribute associated therewith, wherein the predefined attribute includes at least one of (i) a predefined schedule, (ii) a type of the local activity, (iii) a cleaning product, (iv) a cleaning equipment, (v) a proximity of the physical spot from a user or a predefined area proximate to the indoor location, (vi) a clock time, or any combinations thereof.

8. The computer-implemented method of claim 7, wherein the predefined schedule includes a predefined maximum duration for completing the local activity within a preset period, wherein the predefined maximum duration is less than the preset period.

9. The computer-implemented method of claim 1, wherein the predefined signal is received by the portable device from another device, wherein the predefined signal is received at the local position in the indoor location.

10. The computer-implemented method of claim 1, further comprising:
    calculating, using the base device, a cumulative duration spent at the local position by the portable device based on a predefined schedule to assess an outcome of the local activity for the physical spot, wherein the outcome is assessed based on at least one of (i) a number of times the portable device passes proximate to the physical spot and (ii) the calculated cumulative duration being compared with a set of one or more predefined time threshold values; and
    providing, using the base device, another indication based on the calculated cumulative duration exceeding a predefined time threshold value in the set of one or more predefined time threshold values.

11. A system for remotely managing a local activity, the system comprising:

a portable device navigable in an indoor location during a local activity; and a base device configured to communicate with the portable device, wherein the base device is configured to:

receive an input from the portable device, wherein the input includes a signal strength of a predefined signal; and provide an indication to a remote device based on a local position of the portable device determined proximate to a physical spot in the indoor location, the indication triggering the remote device to display a time duration spent by the portable device in the indoor location, wherein the remote device is configured to display the time duration based on the input and upon being triggered by the indication, wherein the time duration is recorded at one or more clock times for remotely managing the local activity.

12. The system of claim 11, wherein the local position is determined proximate to the physical spot based on a comparison between the signal strength and a set of one or more predetermined signal strengths of the predefined signal, wherein the set is associated with at least one of the physical spot and the indoor location.

13. The system of claim 11, wherein the time duration is recorded by at least one of the portable device and the base device, and wherein the input is received by the remote device from the portable device or a remote database in communication with the base device or the portable device.

14. The system of claim 11, wherein the time duration is recorded within a preset period.

15. The system of claim 11, wherein the remote device includes the portable device.

16. The system of claim 11, wherein the base device is further configured to:

calculate a plot position of the physical spot relative to the local position of the portable device, the relative plot position being calculated based on the input and a predetermined dataset including a plurality of plot points and one or more signal strengths associated therewith of the predefined signal, wherein the plurality of plot points corresponds to physical spots in the indoor location.

17. The system of claim 11, wherein the physical spot is selected based on a predefined attribute associated therewith, wherein the predefined attribute includes at least one of (i) a predefined schedule, (ii) a type of the local activity, (iii) a cleaning product, (iv) a cleaning equipment, (v) a proximity of the physical spot from a user or a predefined area proximate to the indoor location, (vi) a clock time, or any combinations thereof.

18. The system of claim 17, wherein the predefined schedule includes a predefined maximum duration for completing the local activity within a preset period, wherein the predefined maximum duration is less than the preset period.

19. The system of claim 11, wherein the predefined signal is received by the portable device from another device, wherein the predefined signal is received at the local position in the indoor location.

20. The system of claim 11, wherein the base device is further configured to:

calculate a cumulative duration spent at the local position by the portable device based on a predefined schedule to assess an outcome of the local activity for the physical spot, wherein the outcome is assessed based on at least one of (i) a number of times the portable device passes proximate to the physical spot and (ii) the calculated cumulative duration being compared with a set of one or more predefined time threshold values; and provide another indication based on the calculated cumulative duration exceeding a predefined time threshold value in the set of one or more predefined time threshold values.

* * * * *